(12) United States Patent
Reges et al.

(10) Patent No.: US 11,104,558 B2
(45) Date of Patent: Aug. 31, 2021

(54) LOAD WHEEL ASSEMBLY FOR PREVENTING AXIAL AND ROTATIONAL MOVEMENT OF AN AXLE

(71) Applicant: Crown Equipment Corporation, New Bremen, OH (US)

(72) Inventors: Clinton L. Reges, Greenville, NC (US); George R. Wetterer, Troy, OH (US); Bruce A. Dubberly, Kinston, NC (US)

(73) Assignee: Crown Equipment Corporation, New Bremen, OH (US)

( * ) Notice: Subject to any disclaimer, the term of this patent is extended or adjusted under 35 U.S.C. 154(b) by 323 days.

(21) Appl. No.: 16/233,607

(22) Filed: Dec. 27, 2018

(65) Prior Publication Data
US 2020/0207598 A1 Jul. 2, 2020

(51) Int. Cl.
| B60P 1/02 | (2006.01) |
| B66F 9/075 | (2006.01) |
| B60B 3/14 | (2006.01) |

(52) U.S. Cl.
CPC ............ *B66F 9/07586* (2013.01); *B60B 3/14* (2013.01); *B60P 1/02* (2013.01)

(58) Field of Classification Search
CPC ........ B60B 3/14; B66F 9/07586; B66F 9/075; B60P 1/02
USPC ..................................................... 280/149.1
See application file for complete search history.

(56) References Cited

U.S. PATENT DOCUMENTS

| 3,260,534 | A | | 7/1966 | Knights | |
| 3,778,080 | A | | 12/1973 | Bilco | |
| 3,779,610 | A | * | 12/1973 | Pansky | ...................... B60B 3/14 |
| | | | | | 301/35.631 |
| 3,857,611 | A | * | 12/1974 | Pansky | ...................... B60B 3/14 |
| | | | | | 301/35.631 |
| 5,136,751 | A | | 8/1992 | Coyne et al. | |
| 5,417,536 | A | | 5/1995 | Cech | |
| 5,586,620 | A | | 12/1996 | Dammeyer et al. | |
| 6,138,796 | A | | 10/2000 | Herschel | |
| 6,199,665 | B1 | | 3/2001 | Eilerman et al. | |
| 6,425,161 | B1 | | 7/2002 | LeMeur et al. | |
| D499,853 | S | | 12/2004 | Ryan et al. | |
| D505,763 | S | | 5/2005 | Greene | |
| 6,904,641 | B2 | | 6/2005 | Magoto et al. | |

(Continued)

FOREIGN PATENT DOCUMENTS

| EP | 743199 B1 | 8/1999 |
| EP | 1502895 A1 | 2/2005 |

(Continued)

OTHER PUBLICATIONS

English Translation of JP-2000007294-A accessed at www.espacenet.com on Jan. 25, 2021. (Year: 2000).*

(Continued)

*Primary Examiner* — James A Shriver, II
*Assistant Examiner* — Hilary L Johns
(74) *Attorney, Agent, or Firm* — Stevens & Showalter LLP

(57) ABSTRACT

A load wheel assembly is provided comprising: a frame member; a side plate coupled to the frame member; an axle extending between the frame member and the side plate; and a keeper coupled by a fastener to the frame member or the side plate. The keeper is coupled to one end of the axle to prevent rotational and axial movement of the axle relative to the frame member and the side plate.

19 Claims, 12 Drawing Sheets

(56) References Cited

U.S. PATENT DOCUMENTS

| | | |
|---|---|---|
| 7,845,657 B2 | 12/2010 | Waltz et al. |
| 7,967,305 B2 | 6/2011 | Bergmeier et al. |
| 8,454,037 B2 | 6/2013 | Waltz et al. |
| 8,528,917 B2 | 9/2013 | Bartels |
| 8,540,253 B2 | 9/2013 | Rath et al. |
| 8,881,366 B2 | 11/2014 | Bornhorst et al. |
| 9,561,700 B2 | 2/2017 | Kraschienski et al. |
| 2005/0034929 A1 | 2/2005 | West et al. |
| 2006/0232030 A1* | 10/2006 | Passeri .................. B62D 51/02 280/43.12 |
| 2015/0352919 A1* | 12/2015 | Kraschienski ........... B60G 7/02 280/86.751 |

FOREIGN PATENT DOCUMENTS

| | | | |
|---|---|---|---|
| GB | 2276852 B | 7/1996 | |
| JP | 2000007294 A | 1/2000 | |
| JP | 2006056647 A | 3/2006 | |
| JP | 2000007294 A * | 7/2020 | .......... B66F 9/07586 |
| WO | 2012150852 A1 | 11/2012 | |

OTHER PUBLICATIONS

Omiros Verheul; International Search Report and Written Opinion; International Application No. PCT/US2019/039379; dated Oct. 14, 2019; European Patent Office; Rijswijk, Netherlands.

\* cited by examiner

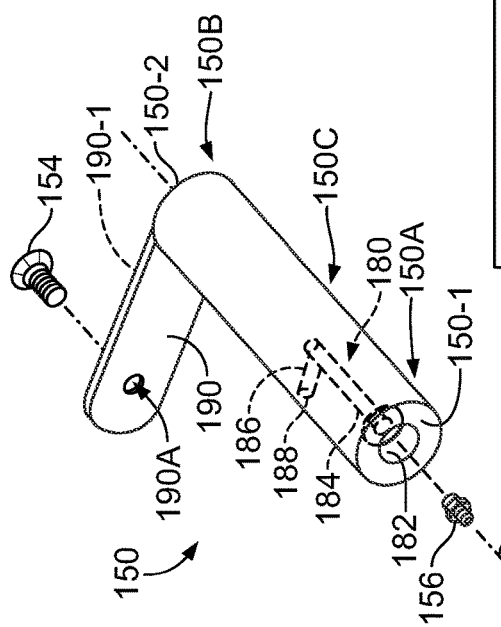
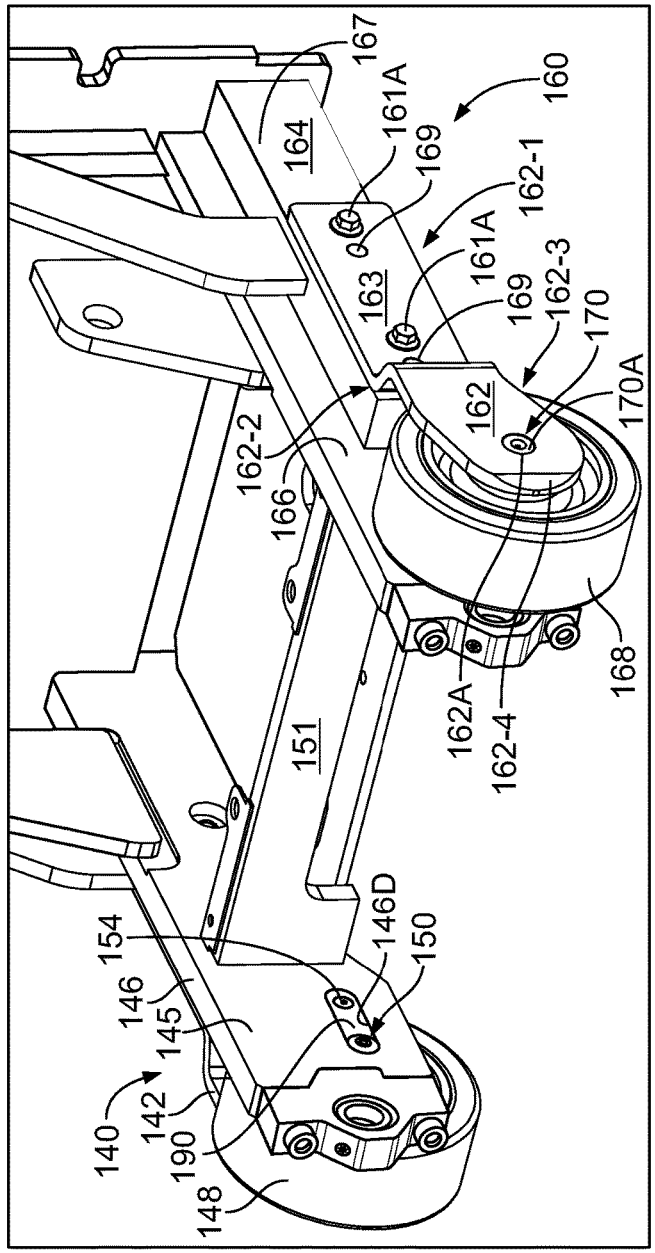
FIG. 9
FIG. 10

LOAD WHEEL ASSEMBLY FOR PREVENTING AXIAL AND ROTATIONAL MOVEMENT OF AN AXLE

FIELD OF THE INVENTION

The present invention relates load wheel assemblies for an industrial vehicle and, more specifically, to load wheel assemblies for preventing axial and rotational movement of an axle.

BACKGROUND OF THE INVENTION

Forklifts and other types of industrial vehicles are typically provided with a pair of forwardly extending load wheel assemblies mounted outside of a vertically movable fork carriage. Each load wheel assembly comprises one or more load wheels that support the weight of the vehicle and a load carried on the fork carriage. The load wheels and other components of the load wheel assemblies experience significant wear and frequently require repair or replacement. Conventional load wheel assemblies typically do not provide convenient access to the load wheel and/or axle and often require disassembly of all or part of the load wheel assembly. In addition, these load wheel assemblies frequently include components that protrude outward, which may be damaged when the outrigger arm assembly impacts an object such as a wall or storage rack. These protruding components may also cause damage to the object that is struck.

SUMMARY OF THE INVENTION

Various aspects and embodiments of the present disclosure address various technical problems associated with preventing axial and rotational movement of an axle in a load wheel assembly of an industrial vehicle. The present disclosure provides a first technical solution that involves use of a keeper that is fixedly coupled to, or integral with, one end of the axle and coupled by a fastener to a frame member or a side plate of the load wheel assembly to prevent rotational and axial movement of the axle relative to the frame member and the side plate. The fastener is offset, in a lateral direction, from a longitudinal axis of the axle. The keeper fixes the axle, while still allowing easy access to a load wheel supported on the axle and to a grease passage formed in the axle with little or no disassembly of the load wheel assembly. Another technical solution provided herein is an anti-rotation feature that minimizes the extent to which the keeper, the axle, and any other component(s) of the load wheel assembly are raised above the outer surfaces of the side plate and/or frame member, which helps to reduce a risk of damage to these components from a side-swipe impact and also helps to reduce the risk of damage to an object that is struck. The recessed keeper may also be used with a side plate having one or more chamfered edges to further reduce the risk of damage. A further technical solution involves fixing of the axle such that an opening through which lubrication is provided to the load wheel is positioned at a predetermined location with respect to the load wheel, which places the opening at a lower stress area, e.g., in a horizontal plane through a neutral axis of the axle. Other technical problems and corresponding solutions are set out herein.

In accordance with an aspect of the present disclosure, a load wheel assembly is provided. The load wheel assembly may comprise a frame member; a side plate coupled to the frame member; an axle extending between the frame member and the side plate; and a keeper coupled by a fastener to the frame member or the side plate. The keeper may be coupled to one end of the axle to prevent rotational and axial movement of the axle relative to the frame member and the side plate.

A portion of the keeper may extend across an outer surface of the side plate or the frame member in a lateral direction that is substantially perpendicular to a longitudinal axis of the axle.

The fastener may be spaced apart in a lateral direction from a longitudinal axis of the axle, in which the lateral direction is substantially perpendicular to the longitudinal axis of the axle.

The keeper may be coupled to the frame member and may comprise an aperture that receives the fastener. An outer surface of the frame member may comprise a recessed area that receives the keeper, in which the recessed area may comprise a threaded bore that receives the fastener.

The keeper may be coupled to the side plate and may comprise an aperture that receives the fastener. An outer surface of the side plate may comprise a recessed area that receives the keeper, in which the recessed area may comprise a threaded bore that receives the fastener.

The keeper may be coupled to the side plate; the one end of the axle may comprise a flattened section; and the keeper may comprise a keeper plate with a flattened edge that engages the flattened section of the one end of the axle. In some examples, the flattened section of the one end of the axle may comprise a cutout, and the flattened edge of the keeper plate may engage the cutout. In other examples, the other end of the axle may be received in an opening extending through a thickness of the frame member, in which an outer section of the opening may comprise a circumferential extension that defines an abutment surface for the axle to prevent axial movement of the axle past the circumferential extension.

The keeper may be coupled to the side plate; the one end of the axle may comprise a plurality of grooves that may be spaced away from an end surface of the axle and may extend inward from an outer surface of the axle; and a portion of the keeper may fit over the one end of the axle and may comprise a plurality of extensions that engage the grooves formed in the one end of the axle.

The keeper may comprise a tab fixedly coupled to an end surface of the one end of the axle, in which the tab may extend outward from the end surface in a direction perpendicular to a longitudinal axis of the axle.

The axle may comprise a central passage formed through a portion of the axle, in which the central passage may extend from an end surface along a longitudinal axis of the axle; and a channel extending from the central passage to an opening in an outer surface of the axle. In some examples, the central passage and the channel may be provided for introducing a lubricant between the axle and a load wheel supported by the axle, and the opening in the outer surface of the axle may be positioned at a predetermined location with respect to the load wheel by the coupling of the keeper to the one end of the axle and to the frame member or the side plate.

The load wheel assembly may further comprise a support arm positioned between and coupled to the frame member and the side plate. In some examples, the side plate may be removably coupled to the support arm via one or more fasteners. In other examples, the support arm may comprise one or more pins extending outwardly from an outer surface thereof, and the side plate may comprise one or more corresponding apertures that receive the pins. In further examples, the support arm may comprise a plurality of rails extending outwardly from an outer surface thereof, and the side plate may be fixedly coupled to the rails.

In accordance with an aspect of the present disclosure, another load wheel assembly is provided. The load wheel assembly may comprise a frame member; a side plate coupled to the frame member; an axle comprising a first end that is received in a first opening formed in the side plate and a second end that is received in a second opening formed in the frame member, in which the first end of the axle comprises a flattened section; and a keeper plate coupled by a fastener to an outer surface of the side plate. The outer surface of the side plate may comprise a recessed area that receives the keeper plate, and the keeper plate may comprise a flattened edge that engages the flattened section of the first end of the axle to prevent rotational movement of the axle relative to the frame member and the side plate.

The flattened section of the first end of the axle may comprise a cutout, and the flattened edge of the keeper plate may engage the cutout.

An outer section of the opening formed in the frame member may comprise a circumferential extension that defines an abutment surface for the second end of the axle to prevent axial movement of the axle past the circumferential extension.

The load wheel assembly may further comprise a support arm positioned between and coupled to the frame member and the side plate, in which the support arm may comprise a plurality of rails extending outwardly from an outer surface thereof and the side plate may be fixedly coupled to the rails.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

FIG. 9 is a detailed perspective view of an axle of the load wheel assembly of FIG. 8;

FIG. 10 is a perspective view of the load wheel assemblies of FIG. 8 in a fully assembled state;

DETAILED DESCRIPTION OF THE INVENTION

In the following detailed description of the preferred embodiments, reference is made to the accompanying drawings that form a part hereof, and in which is shown by way of illustration, and not by way of limitation, specific preferred embodiments in which the invention may be practiced. It is to be understood that other embodiments may be utilized and that changes may be made without departing from the spirit and scope of the present invention.

Figure 1:
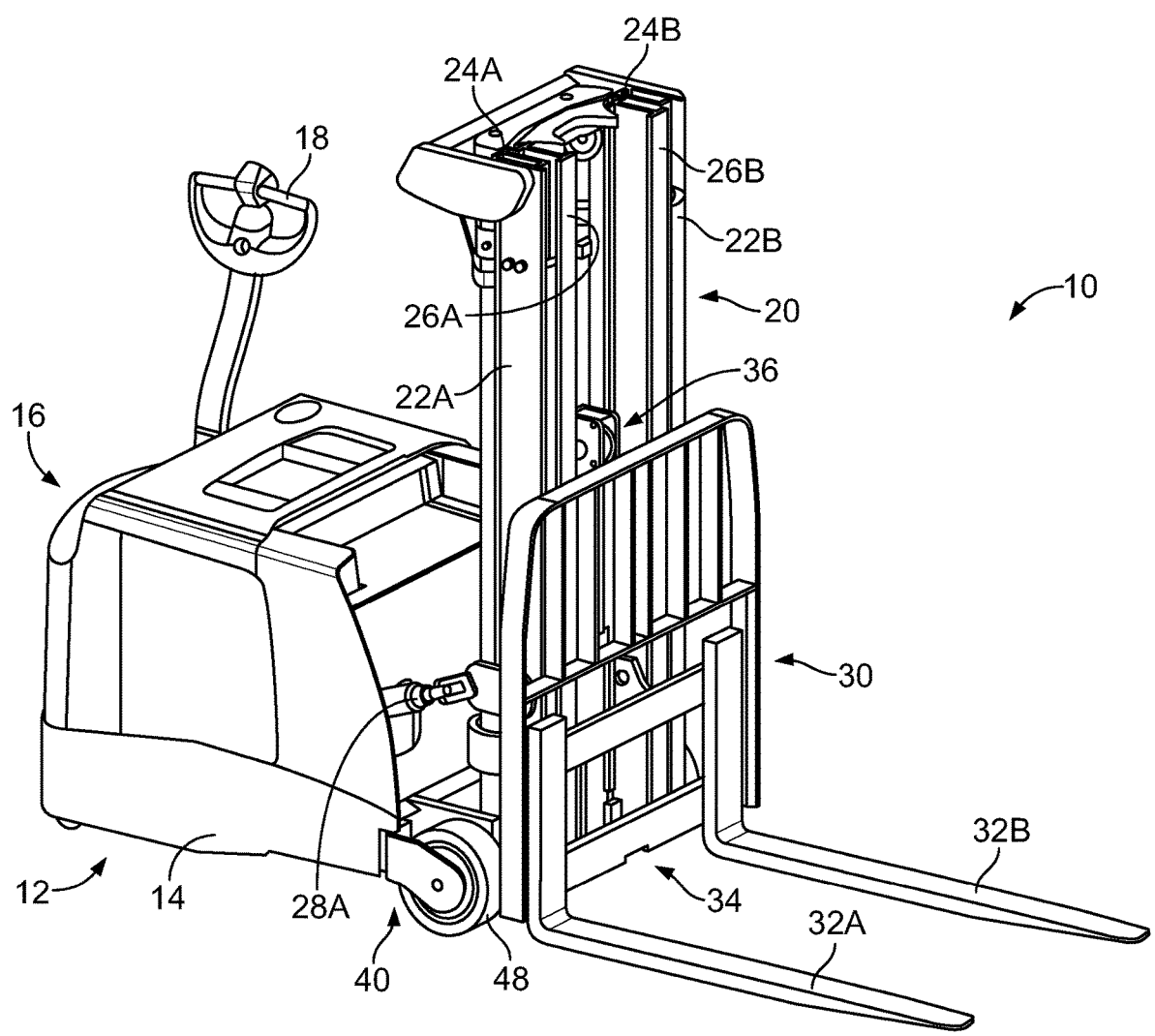
FIG. 1 is a perspective view of an industrial vehicle, in accordance with principles of the present disclosure.

FIG. 1 illustrates an exemplary industrial vehicle 10 in accordance with an aspect of the present disclosure. The industrial vehicle 10 may be in the form of a materials handling vehicle such as a walkie stacker truck in which an operator walks behind the industrial vehicle 10. While the present disclosure is made with reference to the illustrated industrial vehicle 10, it will be apparent to those of skill in the art that the industrial vehicle 10 may comprise a variety of other industrial vehicles, such as a forklift truck, a reach truck, an order picker, etc., and that the following description with reference to the Figures should not be limited to a walkie stacker truck unless otherwise specified.

Figure 2:
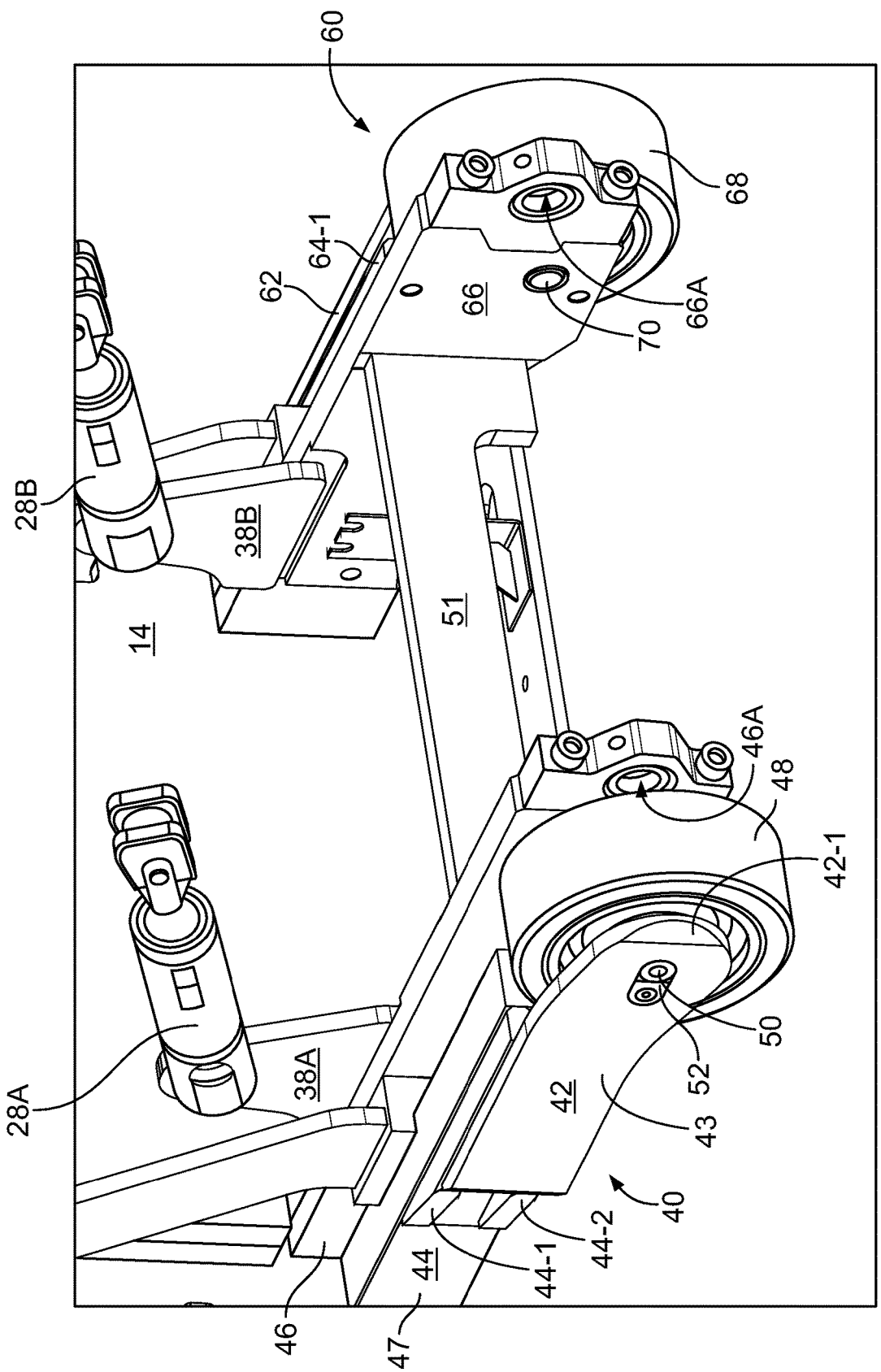
FIG. 2 is a perspective view of load wheel assemblies of an industrial vehicle, in accordance with principles of the present disclosure.

With reference to FIGS. 1 and 2, the industrial vehicle 10 may comprise a main body or power unit 12, a mast assembly 20 and a load handling assembly comprising a fork carriage assembly 30. The power unit 12 includes a frame 14 that defines a main structural component of the industrial vehicle 10 and houses a battery (not shown). The battery supplies power to a drive or traction motor (not shown) and to one or more hydraulic motors (not shown). An operator's area 16 may comprise a steering tiller 18 that may be used by an operator to control movement and operation of the industrial vehicle 10. The power unit 12 may be supported on a plurality of wheels that enable the industrial vehicle 10 to move across a floor surface and may comprise one or more steerable, powered or driven wheels (not shown) and a pair of forwardly extending load wheel assemblies 40, 60 with one or more non-driven load wheels 48, 68. As used herein, the terms "forward," "front," and derivatives thereof refer to a direction away from the power unit 12 and toward the fork carriage assembly 30, while the terms "back," "rear," and derivatives thereof refer to a direction toward the power unit 12 and away from the fork carriage assembly 30. The terms "left" and "right" refer to a position of a given component as seen in the Figures and are not intended to be limiting with respect to a particular side of the industrial vehicle 10.

The mast assembly 20 may include first mast weldments 22A, 22B (referred to herein collectively with reference numeral 22) that are coupled to the frame 14; second mast weldments 24A, 24B (referred to herein collectively with reference numeral 24) that may be nested within respective ones of the first mast weldments 22; and third mast weldments 26A, 26B (referred to herein collectively with reference numeral 26) that may be nested within respective ones of the second mast weldments 24. The second mast weldments 24 may be capable of vertical movement relative to the first mast weldments 22, and the third mast weldments 26 may be capable of vertical movement relative to the first and second mast weldments 22, 24. Although the mast assembly 20 is described herein as comprising three mast weldments 22, 24, 26, mast assemblies with additional or fewer mast weldments may be used. The fork carriage assembly 30 may comprise a pair of forks 32A, 32B coupled to a fork carriage 34. The industrial vehicle 10 may comprise a primary lift cylinder assembly 36 and one or more additional lift cylinder assemblies (not shown) that provide for raising and lowering of the movable mast weldments, e.g., the second and third mast weldments 24, 26, and the fork carriage assembly 30 in a known manner.

With continued reference to FIGS. 1 and 2, the industrial vehicle 10 may further comprise first and second tilt ram/cylinder units 28A, 28B (referred to herein collectively with reference numeral 28) that are coupled between the frame 14 and the first mast weldments 22. The tilt ram/cylinder units 28 may be coupled, for example, to first and second brackets 38A, 38B, which may be fixedly coupled to the load wheel assemblies 40, 60, e.g., to frame members 46, 66. As used herein, the term "fixedly coupled" may refer to welding, brazing, crimping, or any other suitable method for joining two metal components in a substantially permanent or non-removable manner. The first mast weldments 22 may comprise an extension (not shown) that is received in openings 46A, 66A formed in a forward end of the frame members 46, 66. Movement of the first and second tilt ram/cylinder units 28 causes the first mast weldments 22 to rotate about the extensions, so as to pivot the mast assembly 20 toward and away from the frame 14 in a known manner.

Figure 3A:
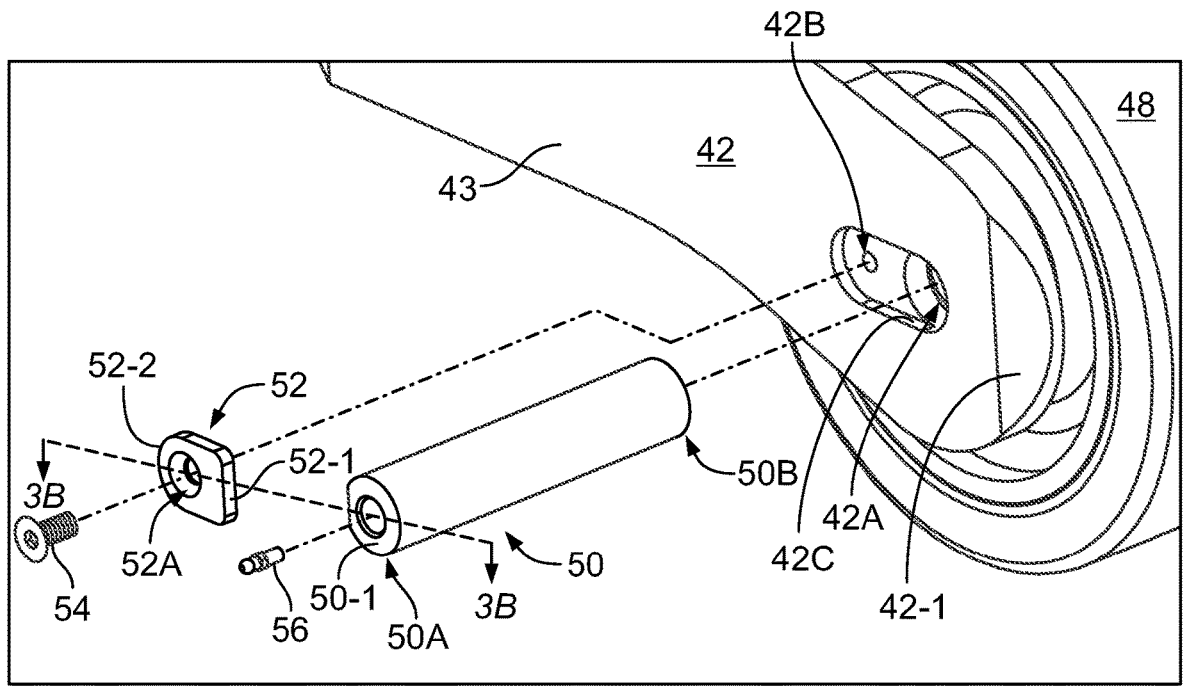
FIG. 3A is an exploded view of the left load wheel assembly of FIG. 2.
Figure 4:
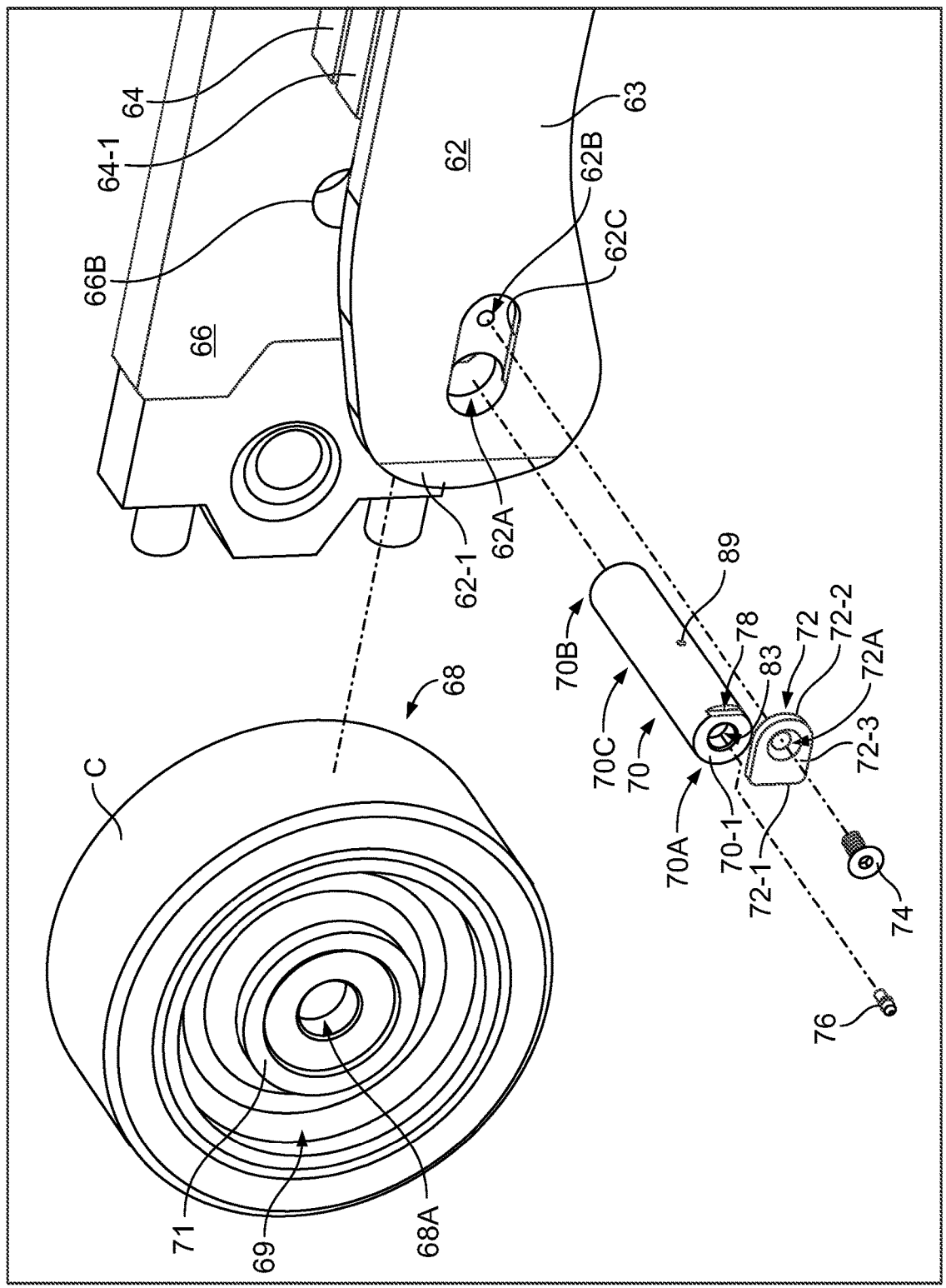
FIG. 4 is an exploded view of the right load wheel assembly of FIG. 2.

FIGS. 2, 3A, and 4 are detailed views of example load wheel assemblies 40, 60 in accordance with an aspect of the present disclosure, in which the mast assembly 20 and fork carriage assembly 30 have been removed to illustrate additional aspects of the load wheel assemblies 40, 60 in detail. Each load wheel assembly 40, 60 may comprise a respective side plate 42, 62, support arm 44, 64, and frame member 46, 66. The frame members 46, 66 extend forward from and are fixedly coupled to the frame 14, and a horizontal support 51 extends between and is fixedly coupled to the frame members 46, 66. The support arms 44, 64 may be fixedly coupled to a respective one of the frame members 46, 66, and the side plates 42, 62 may be coupled to a forward end of a respective one of the support arms 44, 64. With reference to the left load wheel assembly 40 in FIG. 2, the support arm 44 may comprise a plurality of rails 44-1, 44-2 extending outwardly from an outer surface 47 of the support arm 44. The rails 44-1, 44-2 may be fixedly coupled to the support arm 44, and the side plate 42 may be fixedly coupled to the rails 44-1, 44-2. Although not shown, it is understood that the support arm 64 may similarly comprise a plurality of rails (only rail 64-1 is visible in FIGS. 2 and 4) to which the side plate 62 is fixedly coupled. Coupling of the side plates 42, 62 to the support arms 44, 64 is described in more detail with respect to the corresponding structures depicted in FIGS. 11 and 12.

The load wheel assemblies 40, 60 may each comprise an axle 50, 70, which may be substantially cylindrical and may comprise a respective first end 50A, 70A and second end 50B, 70B. The axles 50, 70 extend between respective ones of the side plates 42, 62 and the frame members 46, 66. In particular, the side plates 42, 62 may each comprise an opening 42A, 62A, and the frame members 46, 66 may each comprise an opening (only one opening 66B is visible in FIG. 4). The openings 42A, 62A, 66B extend through a thickness of the respective side plate 42, 62 or frame member 46, 66 and receive the axles 50, 70, as described below. A load wheel 48, 68 may be rotatably mounted to and supported on a respective one of the axles 50, 70. With reference to FIG. 4, the load wheel 68 may comprise a casted wheel 69 with a bearing 71 mounted within the casted wheel 69, in which the bearing 71 comprises a central opening 68A that receives the axle 70. A wheel cover C is formed over the casted wheel 69 and may comprise, for example, polyurethane. One or more washers (not shown; see reference numerals 75 and 275 in FIGS. 7A, 7B, and 13A) may be provided on the axles 50, 70 between each load wheel 48, 68 and adjacent portions of the side plates 42, 62 and frame members 46, 66. Although not shown in detail, the load wheel 48 of the load wheel assembly 40 may comprise a substantially similar structure.

With continued reference to FIGS. 2, 3A, and 4, to install the axles 50, 70, the second end 50B, 70B of the axles 50, 70 may be inserted from the outside of the load wheel assemblies 40, 60 into the opening 42A, 62A formed in a respective one of the side plates 42, 62 and through the respective central openings 68A in the load wheels 48, 68. The second end 50B, 70B of each axle 50, 70 may then be inserted into the opening 66B formed in a respective one of the frame members 46, 66, such that the first end 50A, 70A of each axle 50, 70 is received in the opening 42A, 62A in the respective side plate 42, 62 and a first end surface 50-1, 70-1 of each axle 50, 70 is substantially flush with an outer surface 43, 63 of the side plate 42, 62.

As described herein in detail, a keeper may be coupled to one end of each axle 50, 70 and to either the side plates 42, 62 or the frame members 46, 66. This coupling of the keeper to the axles 50, 70 fixes each axle 50, 70 relative to the load wheel assemblies 40, 60 and prevents rotational and/or axial movement of the axles 50, 70 relative to the frame members 46, 66, the side plates 42, 62, and other components of the load wheel assemblies 40, 60. As used herein with respect to the axles 50, 70, the term "fixed" means that there is no movement or only a slight amount of movement of the axles 50, 70 relative to the side plates 42, 62, the frame members, 46, 66, and/or other components of the load wheel assemblies 40, 60.

Figure 3B:
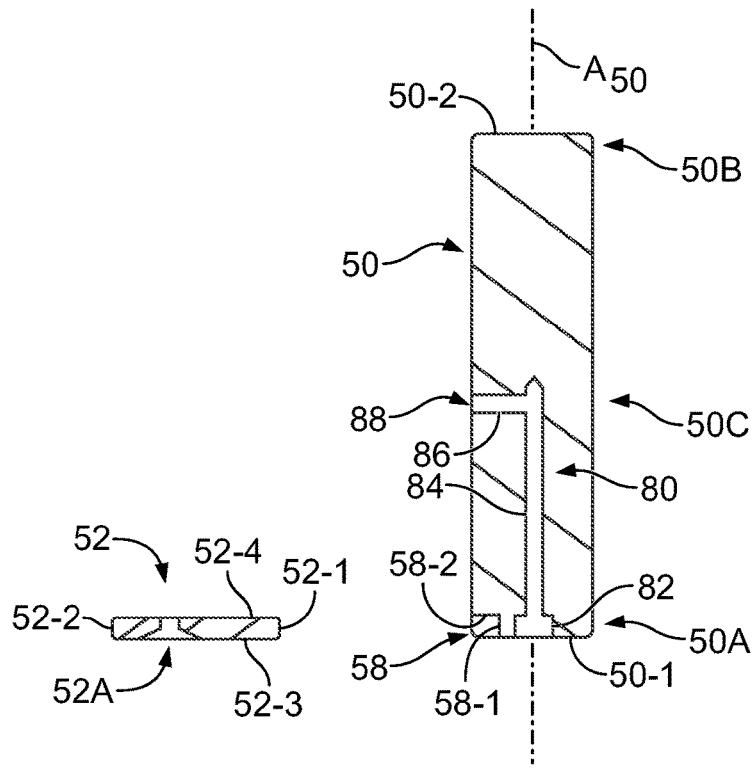
FIG. 3B is a cross-sectional view taken along line 3B-3B in FIG. 3A.

With reference to FIGS. 2, 3A, and 3B, the keeper may comprise a keeper plate 52 with a first, flattened edge 52-1; a second, rounded or curved edge 52-2 joined to the first edge 52-1 by substantially straight edges (not separately labeled); a substantially planar outer surface 52-3; and a substantially planar inner surface 52-4. At least a portion of the keeper plate 52 extends across the outer surface 43 of the side plate 42 in a lateral direction, i.e., in a direction that is substantially perpendicular to a longitudinal axis $A_{50}$ of the axle 50. The keeper plate 52 may be received in a recessed area 42C formed in the outer surface 43 of the side plate 42. As shown in FIG. 3A, the opening 42A in the side plate 42 that receives the axle 50 may also be formed in the recessed area 42C. A shape and one or more dimensions (e.g., a length, width, and depth) of the recessed area 42C may correspond to an outer shape and one or more dimensions of at least a portion of the keeper plate 52. For example, as shown in FIG. 3A, the shape and dimensions of the recessed area 42C may substantially correspond to the curved second edge 52-2 and the substantially straight edges of the keeper plate 52 such that the keeper plate 52 fits snugly in and engages the recessed area 42C.

The keeper plate 52 may comprise an aperture 52A extending between the outer and inner surfaces 52-3, 52-4 through a thickness of the keeper plate 52. The aperture 52A receives a fastener 54, which extends through the keeper plate 52 and is received in a threaded bore 42B formed in the recessed area 42C of the side plate 42. The aperture 52A and fastener 54 may be offset or spaced apart in the lateral direction from the longitudinal axis $A_{50}$ of the axle 50. Following installation of the axle 50 as described above, the first end surface 50-1 of the axle 50 may be substantially flush with the outer surface 43 of the side plate 42. The keeper plate 52 may then be installed into the recessed area 42C and the fastener 54 may be inserted through the aperture 52A and received in the threaded bore 42B formed in the side plate 42 to secure the keeper plate 52 to the side plate 42. The depth of the recessed area 42C may be such that the outer surface 52-3 of the keeper plate 52 is substantially flush with the outer surface 43 of the side plate 42. In addition, the fastener 54 may comprise a threaded screw, bolt, or other type of fastener with a countersunk head comprising a substantially conical bearing surface, and the aperture 52A may comprise a corresponding countersink, such that when the fastener 54 is received in the aperture 52A of the keeper plate 52, the fastener 54 may be substantially flush with the outer surface 52-3 of the keeper plate 52 and with the outer surface 43 of the side plate 42, as best seen in FIG. 2.

The keeper plate 52 may be coupled to and engage the first end 50A of the axle 50 to prevent the axle 50 from rotating and to prevent the axle 50 from moving axially, e.g., in a direction parallel to the longitudinal axis $A_{50}$ of the axle 50. In particular, the keeper plate 52 engages a flattened section 58 formed in the first end 50A of the axle 50. As shown in FIG. 3B, the flattened section 58 of the axle 50 may comprise a cutout with a first section 58-1 extending inward from the first end surface 50-1 of the axle 50 toward the second end 50B in a direction that is substantially parallel to the longitudinal axis $A_{50}$ of the axle 50. A second section 58-2 of the cutout extends from the first section 58-1 to an outer surface (not separately labeled) of the axle 50 in a direction that is substantially perpendicular to the first section 58-1 and to the longitudinal axis $A_{50}$ of the axle 50. The first flattened first edge 52-1 of the keeper plate 52 contacts and engages the first section 58-1 of the cutout formed in the axle 50, which prevents rotational movement of the axle 50 relative to the side plate 42 and the frame member 46. A portion of the inner surface 52-4 of the keeper plate 52 contacts and engages the second section 58-2 of the cutout, which prevents axial movement of the axle 50 in a first direction, e.g., movement of the axle 50 outward from the side plate 42. Axial and rotational movement of the keeper plate 52 is prevented by coupling of the keeper plate 52 to the side plate 42 via the fastener 54 and by engagement between the keeper plate 52 and the recessed area 42C in the side plate 42, as described above.

With reference to FIGS. 2 and 4, the right load wheel assembly 60 may similarly comprise a keeper in the form of a keeper plate 72 with a structure that may be substantially similar to the keeper plate 52. The keeper plate 72 may comprise a first, flattened edge 72-1; a second, rounded or curved edge 72-2 joined to the first edge 72-1 by substantially straight edges (not separately labeled); an outer surface 72-3; and an inner surface (not shown). At least a portion of the keeper plate 72 extends across the outer surface 63 of the side plate 62 in a lateral direction, i.e., in a direction that is substantially perpendicular to a longitudinal axis (not shown; see FIGS. 7A and 7B) of the axle 70. The keeper plate 72 may be received in a recessed area 62C formed in the outer surface 63 of the side plate 62. The opening 62A in the side plate 62 that receives the axle 70 may also be formed in the recessed area 62C. As described in detail with respect to the side plate 42 and keeper plate 52, the shape and dimensions of the recessed area 62C may correspond to the outer shape and dimensions of at least a portion of the keeper plate 72, such that the keeper plate 72 fits snugly in and engages the recessed area 62C.

The keeper plate 72 may comprise an aperture 72A extending through a thickness of the keeper plate 72 that receives a fastener 74. The aperture 72A and fastener 74 may be substantially similar to the aperture 52A and fastener 54, with the aperture 72A and fastener 74 being spaced apart in the lateral direction from the longitudinal axis (not shown; see FIGS. 7A and 7B) of the axle 70. The fastener 74 extends through the keeper plate 72 and is received in a threaded bore 62B formed in the recessed area 62C of the side plate 62. Following installation of the axle 70 as described above, the first end surface 70-1 of the axle 70 may be substantially flush with the outer surface 63 of the side plate 62. The keeper plate 72 may then be installed into the recessed area 62C and the fastener 74 may be inserted through the aperture 72A in the keeper plate 72 and received in the threaded bore 62B formed in the side plate 62 to secure the keeper plate 72 to the side plate 62. Similar to the side plate 42, a depth of the recessed area 62C formed in the side plate 62 may be such when the keeper plate 72 is installed in the recessed area 62C, the outer surface 72-3 of the keeper plate 72 is substantially flush with the outer surface 63 of the side plate 62. Similar to the keeper plate 52, when the fastener 74 is received in the aperture 72A of the keeper plate 72, the fastener 74 may be substantially flush with the outer surface 72-3 of the keeper plate 72 and the outer surface 63 of the side plate 62.

With reference to FIG. 4, the keeper plate 72 may be coupled to and engage the first end 70A of the axle 70 to prevent the axle 70 from rotating and to prevent the axle 70 from moving axially. Similar to the keeper plate 52, the keeper plate 72 engages a flattened section 78 formed in the first end 70A of the axle 70, which may comprise a cutout. As described in detail with respect to the axle 50 and the keeper plate 52, the keeper plate 72 engages the cutout formed in the axle 70 to prevent rotational movement of the axle 70 relative to the side plate 62 and the frame member 66 and axial movement of the axle 70 in a first direction, e.g., movement of the axle 70 outward from the side plate 62. As previously described, axial and rotational movement of the keeper plate 72 is prevented by coupling of the keeper plate 72 to the side plate 62 via the fastener 74 and by engagement between the keeper plate 72 and the recessed area 62C in the side plate 62.

As described above, the keeper plates 52, 72 secure the axles 50, 70 to the side plates 42, 62 and act as anti-rotation features that prevent rotational movement of the axles 50, 70 with respect to side plates 42, 62 and frame members 46, 66, as well as axial movement of the axles 50, 70. The keeper plates 52, 72 further allow the load wheels 48, 68 to be serviced and/or replaced without the need to remove the side plates 42, 62 and/or other components of the load wheel assemblies 40, 60, the mast assembly 20, or the fork carriage assembly 30 (see FIG. 1). In general, following installation of the mast assembly 20, the second ends 50B, 70B of the axles 50, 70 may be fully or partially blocked and may no longer be accessible. To service and/or replace the load wheels 48, 68, the keeper plates 52, 72 may be uninstalled by removing the fasteners 54, 74, and the axles 50, 70 may be removed from the outside of the load wheel assemblies 40, 60 through the openings 42A, 62A in the side plates 42, 62 in a known manner using an axle removal tool.

As shown in FIGS. 2, 3A, and 3B, a forward end of each side plate 42, 62 may comprise a chamfered leading or front edge 42-1, 62-1 that may be angled slightly inward toward respective ones of the frame members 46, 66. During operation of the industrial vehicle 10, the load wheel assemblies 40, 60 may contact an object, such as a wall of a semi-trailer or a building, a shelf or storage rack, a pallet, or a box or other package containing packaged goods, as the industrial vehicle 10 is traveling parallel to or approaching the object (referred to herein as a side-swipe impact). The side plates 42, 62 typically are the outermost component of the load wheel assembly 40, 60 and are the most likely to impact the object. The chamfered front edges 42-1, 62-1 provide a larger contact area, which may allow the front edges 42-1, 62-1 of the side plates 42, 62 to deflect and slide over or along the object rather than catching or snagging on it and damaging the object and/or the side plates 42, 62. In addition, because the first end surfaces 50-1, 70-1 of the axles 50, 70, the keeper plates 52, 72, and the fasteners 54, 74 are all generally flush with the outer surfaces 43, 63 of the respective side plates 42, 62, the outer surfaces 43, 63 of the side plates 42, 62 are substantially smooth with no raised features. This lack of raised features may help to reduce the risk of damage to the axles 50, 70, keeper plates 52, 72, fasteners 54, 74, and other components of the load wheel assemblies 40, 60 from side-swipe impacts and other types of impacts and may also help to reduce the risk of damage to the object that is struck, as the smoothness of the outer surfaces 43, 63 of the side plates 42, 62 may allow the side plates 42, 62 to slide along objects rather than catching on them. Additional details regarding the shape of the side plates 42, 62 are discussed with respect to the corresponding structures in FIGS. 11, 12, and 13A.

Figure 6:
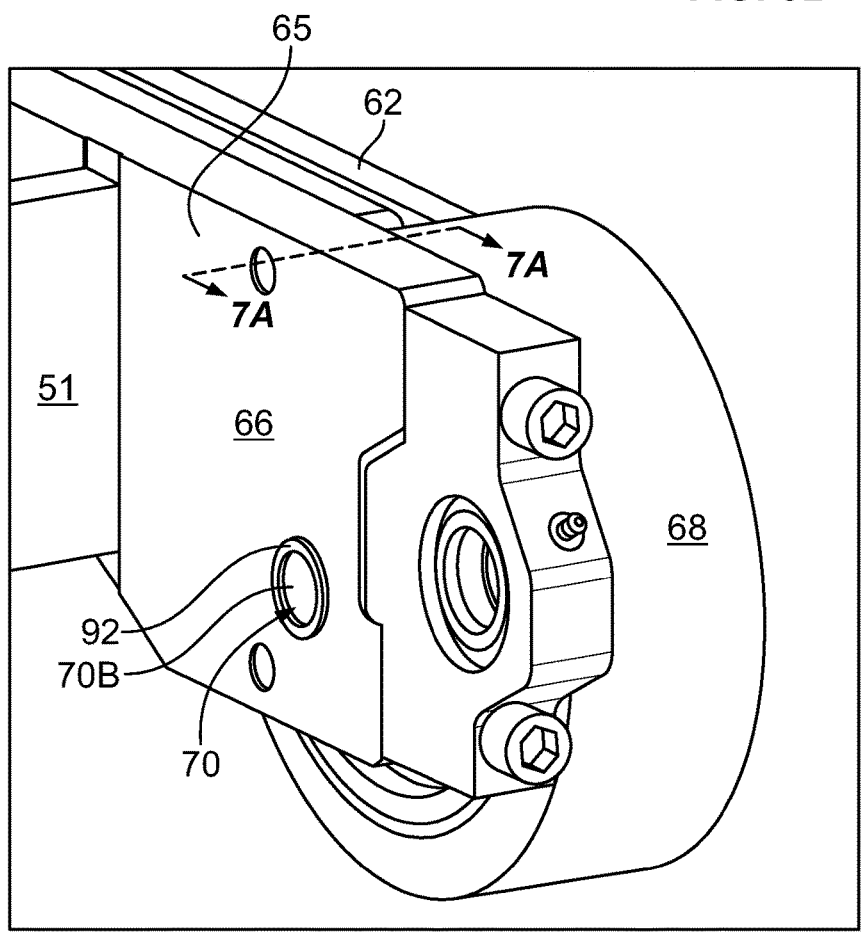
FIG. 6 is a detailed perspective view of the right load wheel assembly of FIG. 2.
Figure 7A:
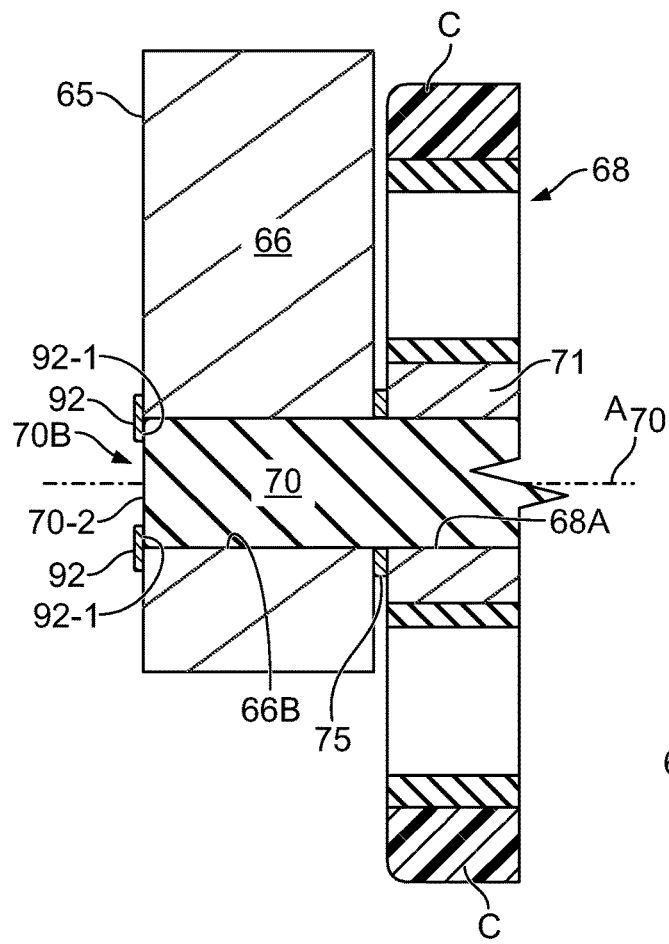
FIG. 7A is a cross-sectional view of a portion of the load wheel assembly taken along line 7A-7A in FIG. 6.

With reference to the frame member 66 in FIGS. 2, 6, 7A, and 7B, an outer section of the opening 66B that receives the second end 70B of the axle 70 may comprise a circumferential extension defining an abutment surface for the axle 70 that prevents axial movement of the axle 70 in a second direction, e.g., in a direction parallel to the longitudinal axis $A_{70}$ inward from the frame member 66 and past the circumferential extension. In some examples as shown in FIGS. 2, 6, and 7A, the circumferential extension may comprise a disk or plate 92 that may be fixedly coupled to an outer surface 65 of the frame member 66 adjacent to the opening 66B. In some particular examples, the plate 92 may be circular and may be solid or may comprise a central aperture (not separately labeled) through which the second end 70B of the axle 70 may be visible, as shown in FIGS. 6 and 7A. An inner surface 92-1 of the plate 92 may define the abutment surface, which contacts a second end surface 70-2 of the axle 70 and prevents the axle 70 from moving axially inward past the plate 92.

Figure 7B:
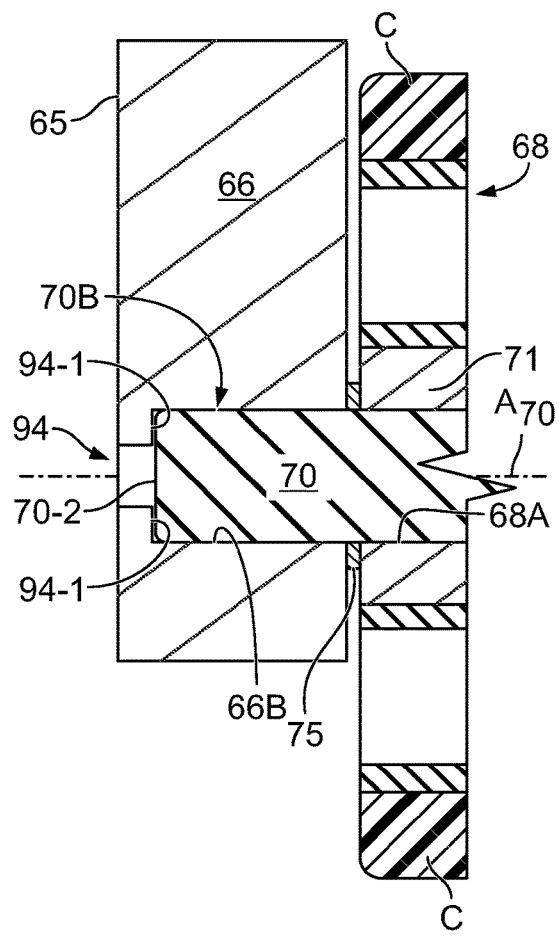
FIG. 7B is a cross-sectional view similar to FIG. 7A of another load wheel assembly, in accordance with the principles of the present disclosure.

FIG. 7B is a cross-sectional view similar to FIG. 7A and depicts another example of a circumferential extension in the form of a counterbore 94, in which a portion of the opening 66B adjacent to the outer surface 65 of the frame member 66 may comprise a reduced diameter, as compared to other portions of the opening 66B. An inner surface 94-1 of the counterbore 94 may define the abutment surface, which contacts the second end surface 70-2 of the axle 70 and prevents the axle 70 from moving axially inward past the counterbore 94. As shown in FIG. 7B, use of the counterbore 94 may allow the outer surface 65 of the frame member 66 to be substantially smooth. Although not shown, it is understood that the frame member 46 may similarly comprise a circumferential extension defining an abutment surface for the axle 50 that receives and contacts a second end surface 50-2 of the axle 50 and prevents the axle 50 from moving axially inward in the second direction, e.g., in a direction parallel to the longitudinal axis $A_{50}$ inward from the frame member 46 and past the circumferential extension.

With reference to FIGS. 3A and 3B, the axle 50 may comprise an internal path 80 for introducing a lubricant (not shown) such as oil or grease between the axle 50 and the load wheel 48 supported by the axle 50. The internal path 80 may be formed by machining or drilling the axle 50 to form the desired pathways. The internal path 80 may comprise a central passage 84 that may be formed through a portion of the axle 50 and extends along the longitudinal axis $A_{50}$ from the first end surface 50-1 toward the second end surface 50-2. A channel 86 extends from the central passage 84 to an opening 88 formed in the outer surface of the axle 50. The opening 88 may be located generally in a central portion 50C of the axle 50. With reference to FIG. 4, the axle 70 may comprise a substantially similar internal path (not shown) for lubricant with a central passage (not shown) and a channel (not shown) extending from the central passage to an opening 89 formed in the outer surface of the axle 70. The opening 89 may be located generally in a central portion 70C of the axle 70.

A grease fitting 56, 76 may be received in a threaded section (not separately labeled) of the central passage 84 adjacent to the first end surface 50-1, 70-1 of the respective axles 50, 70. An enlarged section 82, 83 of the central passage 84 in each axle 50, 70 allows access to the grease fittings 56, 76 and allows the grease fittings 56, 76 to be recessed into the first ends 50A, 70A of the axles 50, 70, which helps to protect the grease fittings 56, 76 from damage and helps to reduce the introduction of contaminants into the internal paths 80 of each axle 50, 70. The grease fittings 56, 76 may comprise, for example, a Zerk fitting. The grease fittings 56, 76 may be accessible from the outside of the load wheel assemblies 40, 60 with no need to remove the side plate 42, 62, keeper plate 52, 72, or other component(s) of the load wheel assemblies 40, 60. Following introduction, the lubricant exits the respective openings 88, 89 and flows between the axles 50, 70 and the load wheels 48, 68.

The opening 88, 89 in each axle 50, 70 may be positioned at a predetermined location with respect to the load wheel 48, 68 by the fixation of the axle 50, 70 via the coupling of the keeper plate 52, 72 to the side plate 42, 62 and to the first ends 50A, 70A of the axle 50, 70. The axles 50, 70 may bend slightly under the weight of the industrial vehicle 10 (see FIG. 1) and/or a load (not shown) on the forks 32A, 32B, and this predetermined location may place the openings 88, 89 at a lower stress area of the axles 50, 70. For example, as shown in FIG. 4, the opening 88, 89 formed in the axles 50, 70 may face toward the power unit 12 of the industrial vehicle 10, such that the openings 88, 89 are located in a horizontal plane through a neutral axis (not labeled) of the axles 50, 70.

Figure 5A:
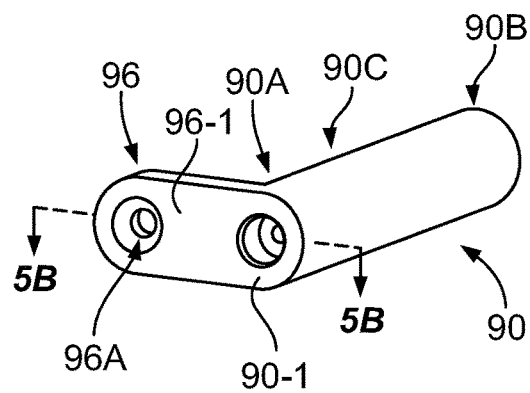
FIG. 5A is a perspective view of an axle, in accordance with principles of the present disclosure.
Figure 5B:
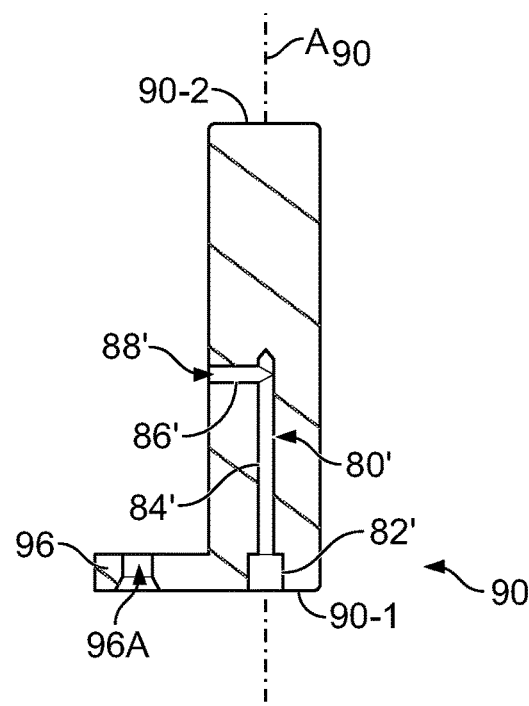
FIG. 5B is a cross-sectional view taken along line 5B-5B in FIG. 5A.

FIGS. 5A and 5B depict an example axle 90 in accordance with another aspect of the present disclosure. The axle 90 comprises a keeper in the form of a tab 96 that extends outward from the first end surface 90-1 in a lateral direction that is substantially perpendicular to a longitudinal axis $A_{90}$ of the axle 90. In some examples, the tab 96 may be formed as part of the axle 90 during manufacture (e.g., by casting, forging, or other suitable method), such that the axle 90 and the tab 96 are a single, integral piece as shown in FIGS. 5A and 5B. In other examples, the tab 96 may be a separate component that is fixedly coupled to the first end 90A of the axle 90 (not shown; see the tabs 190, 196 in FIGS. 8 and 9). The axle 90 may be used with the load wheel assemblies 40, 60 shown in FIGS. 2, 3A, and 4 and may be installed in the same manner as described herein with respect to the axles 50, 70, with the tab 96 being received in the recessed area 42C, 62C of the side plates 42, 62. At least a portion of the tab 96 extends across the outer surface 43, 63 of the side plates 42, 62 in the lateral direction. The tab 96 may comprise an aperture 96A extending through a thickness of the tab 96 that receives a fastener, e.g., fastener 54/74, which extends through the tab 96 and is received in the threaded bore 42B, 62B formed in the recessed area 42C, 62C of the side plate 42, 62. The aperture 96A may be substantially similar to the apertures 52A, 72A, in which the fastener 54/74 and the aperture 96A may be spaced apart in the lateral direction from the longitudinal axis $A_{90}$ of the axle 90. When the axle 90 is installed, the first end surface 90-1 of the axle 90 and an outer surface 96-1 of the tab 96 may be substantially flush with the outer surface 43, 63 of the respective side plates 42, 62. The aperture 96A may comprise a countersink, as described above with respect to the apertures 52A, 72A, such that when the fastener 54, 74 is received in the aperture 96A, the fastener 54, 74 may be substantially flush with the outer surface 96-1 of the tab 96.

As described above with respect to FIGS. 6, 7A, and 7B, a second end 90B of the axle 90 would be received in the openings 66B formed in the frame members 46, 66, in which the opening 66B may optionally comprise a circumferential extension defining an abutment surface for the axle 90 that prevents axial movement of the axle 90 in one direction, e.g., in a direction parallel to the longitudinal axis $A_{90}$ inward from the frame member 46, 66 and past the circumferential extension. However, as described below, securing the tab 96 to the side plate 42, 62 prevents axial movement of the axle 90 in both directions. Thus, the openings 66B formed in the frame members 46, 66 may lack the circumferential extension, and a second end surface (not shown) of the axle 90 may be substantially flush with an outer surface 65 of the frame members 46, 66.

The tab 96 may be secured to the side plates 42, 62 by the fasteners 54, 74, and engagement between the tab 96 and the recessed areas 42C, 62C prevents axial and rotational movement of the tab 96. For example, as described above with respect to the keeper plates 52, 72, an outer shape of the tab 96 may comprise a rounded edge and two substantially straight edges (not separately labeled), and the shape and dimensions of the recessed areas 42C, 62C may correspond to the outer shape and dimensions of at least a portion of the tab 96. The tab 96 fits snugly in and engages the recessed areas 42C, 62C, which prevents axial and rotational movement of the tab 96. Because the tab 96 is fixedly coupled to or integral with the axle 90, securing the tab 96 to the side plates 42, 62 also prevents rotational movement of the axle 90 and axial movement of the axle 90 along its longitudinal axis $A_{90}$ in both directions, e.g., outward from the side plates 42, 62 and inward from the frame members 46, 66.

As shown in FIG. 5B, the axle 90 may comprise an internal path 80' that may be substantially similar to the internal path 80 described with respect to the axle 50 in FIG. 3B. The internal path 80' may comprise an enlarged section 82', a central passage 84', and a channel 86' that extends from the central passage 84' to an opening 88' formed in an outer surface of the axle 90. Although not shown, a grease fitting may be received in a threaded section (not separately labeled) of the central passage 84' adjacent to the first end surface 90-1 of the axle 90, as described above with respect to the axles 50, 70. Similar to the axles 50, 70, the enlarged section 82' allows the grease fitting to be recessed into the first end 90A of the axle 90. Following installation of the axle 90, the grease fitting may be accessed from the outside of the load wheel assemblies 40, 60 to introduce lubricant without the need to remove the side plates 42, 62 or other components of the load wheel assemblies 40, 60. The opening 88' in the axle 90 may be located generally in a central portion 90C of the axle 90 and may be positioned at a predetermined location with respect to the load wheel, e.g., load wheel 48/68, by the fixation of the axle 90 from rotational and axial movement.

Figure 8:
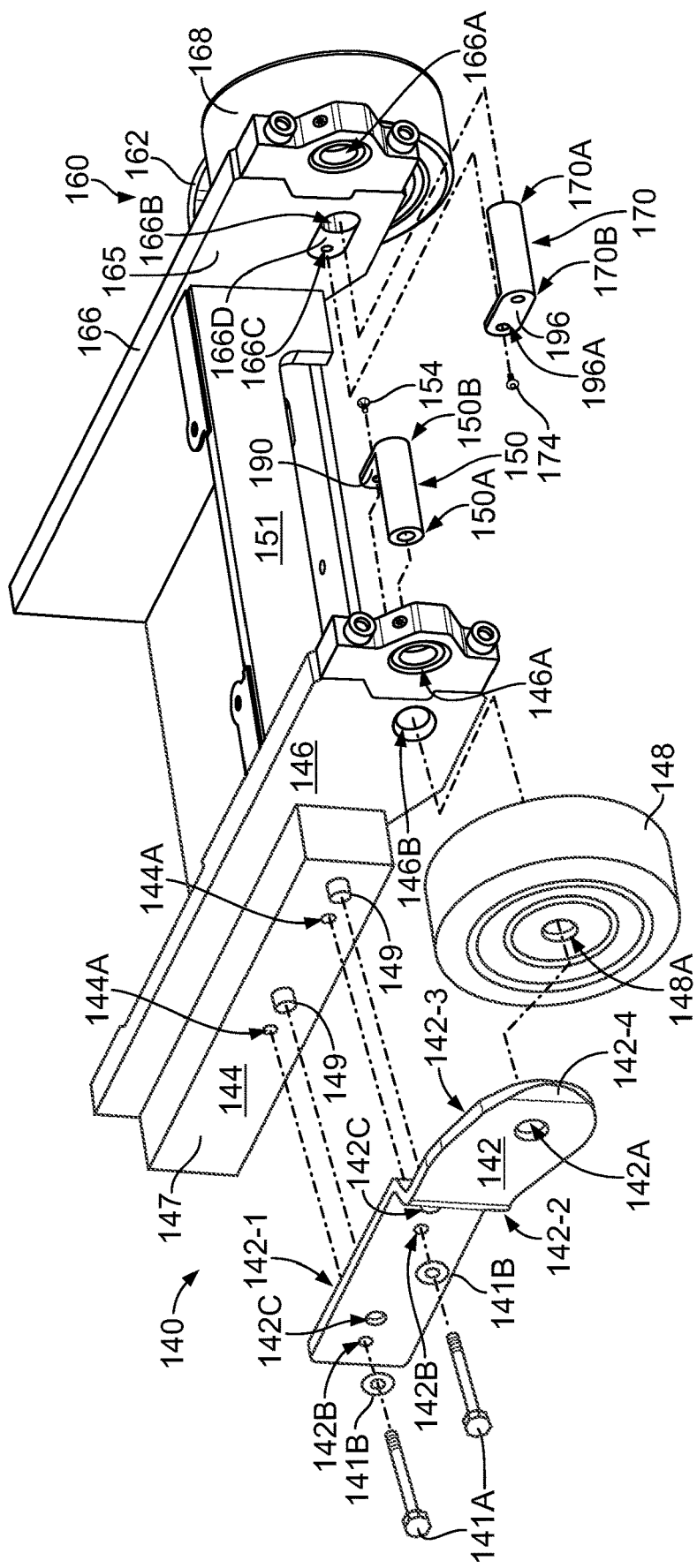
FIG. 8 is a partially exploded, perspective view of the load wheel assemblies of an industrial vehicle, in accordance with principles of the present disclosure.

FIGS. 8-10 illustrate example load wheel assemblies 140, 160 in accordance with another aspect of the present disclosure, in which the mast assembly 20 and fork carriage assembly 30 have been removed to illustrate additional aspects of the load wheel assemblies 140, 160 in detail. Each load wheel assembly 140, 160 may comprise a respective side plate 142, 162, support arm 144, 164, and frame member 146, 166. The frame members 146, 166 extend forward from and are fixedly coupled to the vehicle frame (not shown), and the support arms 144, 164 may be fixedly coupled to a respective one of the frame members 146, 166. The side plates 142, 162 may be removably coupled to a forward end of a respective one of the support arms 144, 164, as described in more detail below. A horizontal support 151 may extend between and be fixedly coupled to the frame members 146, 166.

The load wheel assemblies 140, 160 may each comprise an axle 150, 170, which may be substantially cylindrical and may comprise a respective first end 150A, 170A and second end 150B, 170B. The axles 150, 170 extend between respective ones of the side plates 142, 162 and the frame members 146, 166. In particular, the side plates 142, 162 may each comprise an opening 142A, 162A extending through a thickness of the side plate 142, 162, and the frame members 146, 166 may each comprise an opening 146B, 166B extending through a thickness of the frame member 146, 166, in which the openings 142A, 162A, 146B, 166B receive the axles 150, 170 as described below. In some examples, the axles 150, 170 may comprise a uniform diameter. In other examples (not shown), the axles 150, 170 may comprise a stepped configuration in which a portion of the axles 150, 170 near a respective second end 150B, 170B (e.g., the portion of each axle 150, 170 that is received in the respective opening 146A, 166A formed in the frame members 146, 166) may comprise a greater diameter, as compared to other portions of the axle 150, 170. A load wheel 148, 168 may be rotatably mounted to and supported on a respective one of the axles 150, 170. The load wheels 148, 168 may comprise a structure substantially similar to the load wheel 68 shown in FIG. 4.

The axles 150, 170 may be fixed to a respective one of the frame members 146, 166 by a keeper in the form of a tab 190, 196 that extends outward from a second end 150B, 170B of the axle 150, 170. With reference to the detailed view of the axle 150 in FIG. 9, the tab 190 extends outward from a second end surface 150-2 of the axle 150 in a direction that is substantially perpendicular to a longitudinal axis $A_{150}$ of the axle 150. The tab 196 similarly extends outward from a second end surface (not labeled) of the axle 170 in a direction that is substantially perpendicular to a longitudinal axis (not shown) of the axle 170. In some examples, the tabs 190, 196 may be separate components that are fixedly coupled to the second ends 150B, 170B of the respective axles 150, 170, as shown in FIGS. 8 and 9. In other examples, the tabs 190, 196 may be formed as an integral part of the axles 150, 170 during manufacture, as described in more detail with respect to the axle 90.

With reference to FIGS. 8 and 10, the tabs 190, 196 may be received in a respective recessed area 146D, 166D formed in an outer surface 145, 165 of the frame members 146, 166. At least a portion of the tab 196 extends across the outer surface 145, 165 of the frame members 146, 166 in a lateral direction, i.e., in a direction that is substantially perpendicular to the longitudinal axis $A_{150}$ of the axles 150, 170. The openings 146B, 166B in the frame members 146, 166 that receive the axles 150, 170 may also be formed in the respective recessed area 146D, 166D. A shape and one or more dimensions (e.g., a length, width, and depth) of the recessed areas 146D, 166D may correspond to an outer shape and one or more dimensions of at least a portion of the tabs 190, 196. For example, as described above with respect to the keeper plates 52, 72, the outer shape of the tabs 190, 196 may comprise a rounded edge and two substantially straight edges (not separately labeled), and the shape and dimensions of the recessed areas 146D, 166D may correspond to the outer shape and dimensions of at least a portion of the tabs 190, 196, such that the tabs 190, 196 fit snugly in and engage the respective recessed area 146D, 166D.

Each tab 190, 196 may comprise an aperture 190A, 196A extending through a thickness of the respective tab 190, 196, as shown in FIGS. 8 and 9. The apertures 190A, 196A receive a respective fastener 154, 174. The apertures 190A, 196A and fasteners 154, 174 may be spaced apart in the lateral direction from the respective longitudinal axes of the axles 150, 170 (only the longitudinal axis $A_{150}$ of the axle 150 is shown). The apertures 190A, 196A may comprise a countersink, and the fasteners 154, 174 may comprise a threaded screw, bolt, or other type of fastener with a countersunk head, as described herein. With reference to the right load wheel assembly 160 in FIG. 8, the fastener 174 extends through the aperture 196A and is received in a threaded bore 166C formed in the recessed area 166D of the frame member 166. With reference to FIGS. 8-10, the fastener 154 similarly extends through the aperture 190A in the tab 190 and is received in a threaded bore (not shown) formed in the recessed area 146D formed in the outer surface 145 of the frame member 146.

To install the axles 150, 170 shown in FIGS. 8-10, the first end 150A, 170A of each axle 150, 170 may be inserted from the inside of the load wheel assemblies 140, 160 into the opening 146B, 166B formed in the respective frame member 146, 166 and through a central opening 148A in the respective load wheel 148, 68. The first ends 150A, 170A of the axles 150, 170 may then be inserted into the openings 142A, 162A formed in the respective side plates 142, 162, with the tabs 190, 196 being received in the respective recessed areas 146D, 166D. The fasteners 154, 174 are inserted through the apertures 190A, 196A in the tabs 190, 196 and received in the threaded bores 166C formed in the respective frame members 146, 166.

With reference to the axle 150, following installation, the second end surface 150-2 of the axle 150 and an outer surface 190-1 of the tab 190 may be substantially flush with the outer surface 145 of the frame member 146, as shown in FIGS. 9 and 10. Because the aperture 190A may comprise a countersink, the fastener 154 may be substantially flush with the outer surface 190-1 of the tab 190 and the outer surface 145 of the frame member 146. Although not shown, the second end surface of the axle 170 and an outer surface of the tab 196 would similarly be substantially flush with the outer surface 165 of the frame member 166, and the fastener 174 would be substantially flush with the outer surface of the tab 196 and the outer surface 165 of the frame member 166. The first ends 150A, 170A of each axle 150, 170 may be received in the side plates 142, 162 such that the first end surfaces of the axles 150, 170 (only the first end surface 150-1 of the axle 150 is labeled) may be substantially flush with, or slightly recessed with respect to, an outer surface 143, 163 of the respective side plates 142, 162.

As described above with respect to the load wheel assemblies 40, 60 in FIGS. 2, 3A, and 3B, ensuring that the outer surfaces 143, 163 of the respective side plates 142, 162 are substantially smooth with no raised features helps to reduce the risk of damage to the axles 150, 170 from side-swipe impacts. Because the second ends 150B, 170B of the axles 150, 170 and the tabs 190, 196 may be substantially flush with the outer surfaces 145, 165 of the frame members 146, 166, the risk of damage to these components may also be reduced. The outer surfaces 145, 165 of the frame members 146, 166 may also be substantially smooth with no raised features.

The shape and dimensions of the recessed areas 146D, 166D may correspond to the outer shape and dimensions of at least a portion of the tabs 190, 196, such that the tabs 190, 196 fit snugly in and engage the recessed areas 146D, 166D as described above, which prevents axial and rotational movement of the tabs 190, 196. Because the tabs 190, 196 are fixedly coupled to or integral with the axles 150, 170, securing the tabs 190, 196 to frame members 146, 166 also prevents rotational movement of the axles 150, 170 and axial movement of the axles 150, 170 along their longitudinal axes in both directions (only longitudinal axis $A_{150}$ of axle 150 is shown), e.g., outward from the side plates 142, 162 and inward from the frame members 146, 166. Thus, the tabs 190, 196 secure the axles 150, 170 to the frame members 146, 166 and act as anti-rotation features that prevent rotational movement and axial movement of the axles 150, 170.

As shown in FIG. 9, the axle 150 may comprise an internal path 180 for introducing a lubricant that may be substantially similar to the internal path 80 described with respect to the axle 50 in FIG. 3B. The internal path 180 may comprise an enlarged section 182, a central passage 184, and a channel 186 that extends from the central passage 184 to an opening 188 formed in an outer surface of the axle 150. A grease fitting 156 may be received in a threaded section (not separately labeled) of the central passage 184 adjacent to the first end surface 150-1 of the axle 150. Similar to the axle 50, the grease fitting 156 is accessible from the outside of the load wheel assembly 140 and lubricant may be introduced into the load wheel assembly 140 with no need to remove the side plate 142 or other component(s) of the load wheel assembly 140. Also similar to the axle 50, the opening 188 in the axle 150 may be located generally in a central portion 150C of the axle 150 and may be positioned at a predetermined location with respect to the load wheel 148 (see FIGS. 8 and 10) by the fixation of the axle 150 from rotational and axial movement. Although not shown, it is understood that the axle 170 may comprise a substantially similar internal path and a grease fitting.

In the configuration shown in FIGS. 8 and 10, the side plates 142, 162 may be removably coupled to respective ones of the support arms 144, 164. For example, with reference to the left load wheel assembly 140, the side plate 142 may comprise one or more apertures 142B extending through a thickness of the side plate 142. The aperture(s) 142B may receive one or more corresponding fasteners 141A, which extend through the side plate 142 and are received in one or more corresponding threaded bores 144A formed in the support arm 144. The fasteners 141A may comprise, for example, threaded screws, bolts, or other type of fasteners. Washers 141B may be placed between the fastener(s) 141A and the side plate 142 in a known manner. The side plate 162 of the right load wheel assembly 160 may similarly be removably coupled to the support arm 164 via fasteners 161A, which pass through apertures (not shown) formed in the side plate 162 and are received in threaded bores (not shown) formed in the support arm 164. Although the load wheel assemblies 140, 160 are depicted in FIGS. 8 and 10 as each comprising two fasteners 141A, 161A, each load wheel assembly 140, 160 may comprise one fastener 141A, 161A or three or more fasteners 141A, 161A (and a corresponding number of apertures 142B and threaded bores 144A).

With reference again to the left load wheel assembly 140 in FIG. 8, the support arm 144 may comprise one or more pins 149 extending outwardly from an outer surface 147 of the support arm 144, and the side plate 142 may comprise one or more corresponding apertures 142C that receive the pin(s) 149 when the side plate 142 is coupled to the support arm 144 via the fasteners 141A. As shown in FIG. 10, the support arm 164 may similarly comprise pins 169 that extend outwardly from an outer surface 167 of the support arm 164 and are received in apertures (not labeled) formed in the side plate 162. Although the load wheel assemblies 140, 160 are depicted in FIGS. 8 and 10 as each comprising two pins 149, 169, each load wheel assembly 140, 160 may comprise one pin 149, 169 or three or more pins 149, 169 (and a corresponding number of apertures 142C). A height of the pins 149, 169 may substantially correspond to a thickness of the respective side plate 142, 162, such that when the side plates 142, 162 are installed on the support arms 144, 164, the pins 149, 169 may be substantially flush with the outer surface 143, 163 of the respective side plates 142, 162. The pins 149, 169 may serve as alignment guides that help to properly position the side plates 142, 162 with respect to the support arms 144, 164 during installation of the side plates 142, 162. The pins 149, 169 may also be load bearing and may provide additional structural support for the side plates 142, 162, the load wheels 148, 168, and the axles 150, 170.

The load wheel assemblies 140, 160 in FIGS. 8-10 may be assembled (typically prior to installation of the mast assembly 20) by inserting the first ends 150A, 170A of the axles 150, 170 into the openings 146B, 166B from the inside of the load wheel assemblies 140, 160; securing the axles 150, 170 to the frame members 146, 166 via the fasteners 154, 174 as described above; and inserting the first ends 150A, 170A of the axles 150, 170 through the central openings 148A of the load wheels 148, 168. The side plates 142, 162 may then be installed by positioning the side plates 142, 162 such that the pins 149, 169 are received in the apertures 142 formed in the respective side plates 142, 162 and inserting the fasteners 141A, 161A through the apertures 142B formed in the side plates 142, 162 so that the fasteners 141A, 161A are received in the threaded bores 144A formed in the support arms 144, 164. The first ends 150A, 170A of the axles 150, 170 are received in the openings 142A, 162A of the side plates 142, 162. Alternatively, the side plates 142, 162 may be installed as described above, after which the load wheels 148, 168 and axles 150, 170 may be installed.

As described above with respect to the axles 50, 70, installation of the mast assembly 20 may at least partially block access to the second ends 150B, 170B of the axles 150, 170. To access the load wheels 148, 168 following the initial assembly of the load wheel assemblies 140, 160, the side plates 142, 162 may be removed from the support arms 144, 164 by removing the fasteners 141A, 161A, and the load wheels 148, 168 may be removed from the axles 150, 170. There is no need to remove the axles 150, 170, which may remain coupled to the frame members 146, 166. In instances in which the mast assembly 20 does not interfere with access to the second ends 150B, 170B of the axles 150, 170, the load wheels 148, 168 may alternatively be accessed without removing the side plates 142, 162, e.g., by removing the fasteners 154, 174 from the tabs 190, 196 and removing the axles 150, 170 from the inside of the load wheel assemblies 140, 160.

To accommodate a thickness of the load wheels 148, 168, the side plates 142, 162 may comprise a shape in the form of a flattened S-curve. With reference to FIGS. 8 and 10, the side plates 142, 162 may each comprise a respective first substantially planar section 142-1, 162-1; a curved section 142-2, 162-2; and a second substantially planar section 142-3, 162-3. The first substantially planar sections 142-1, 162-1 extend along at least a portion of the support arms 144, 164 parallel to the outer surface 147, 167 and comprise the apertures 142B, 142C for receiving the fasteners 141A, 161A and pins 149, 169. The curved sections 142-2, 162-2 extend outward from the outer surface 147, 167 of the respective support arm 144, 164 at a relatively shallow angle (an angle of, for example, greater than 90 degrees) with respect to the first substantially planar section 142-1, 162-1. The second substantially planar sections 142-3, 162-3 extend forward from the curved sections 142-2, 162-2 and comprise the openings 142A, 162A for receiving the first ends 150A, 170A of the axles 150, 170. The second substantially planar sections 142-3, 162-3 may be substantially parallel to the first substantially planar sections 142-1, 162-1, the support arms 144, 164, and the frame members 146, 166. A degree of curvature and dimension of each curved section 142-2, 162-2 may be configured such that the second substantially planar sections 142-3, 162-3 are spaced apart axially (i.e., in a direction parallel to the axis $A_{150}$ of the axle 150) from the frame members 146, 166 a sufficient distance to accommodate the load wheels 148, 168.

A forward end of each of the second substantially planar sections 142-3, 162-3 may comprise a chamfered leading or front edge 142-4, 162-4, which may help to prevent the side plates 142, 162 from catching on an object during a sideswipe or other type of impact and damaging the object and/or components of the load wheel assemblies 140, 160, as described above with respect to the load wheel assemblies 40, 60 in FIGS. 2, 3A, and 3B. Because of the curvature of the side plates 142, 162, the second substantially planar sections 142-3, 162-3 may comprise an outermost component of the load wheel assemblies 140, 160, and the first substantially planar sections 142-1, 162-1 may be recessed with respect to the second substantially planar sections 142-3, 162-3, which may help to protect the fasteners 141A, 161A against damage from impacts. As shown in FIG. 1, a portion of the frame 14 may extend over the first substantially planar sections 142-1, 162-1, which may further help to protect the fasteners 141A, 161A.

Figure 11:
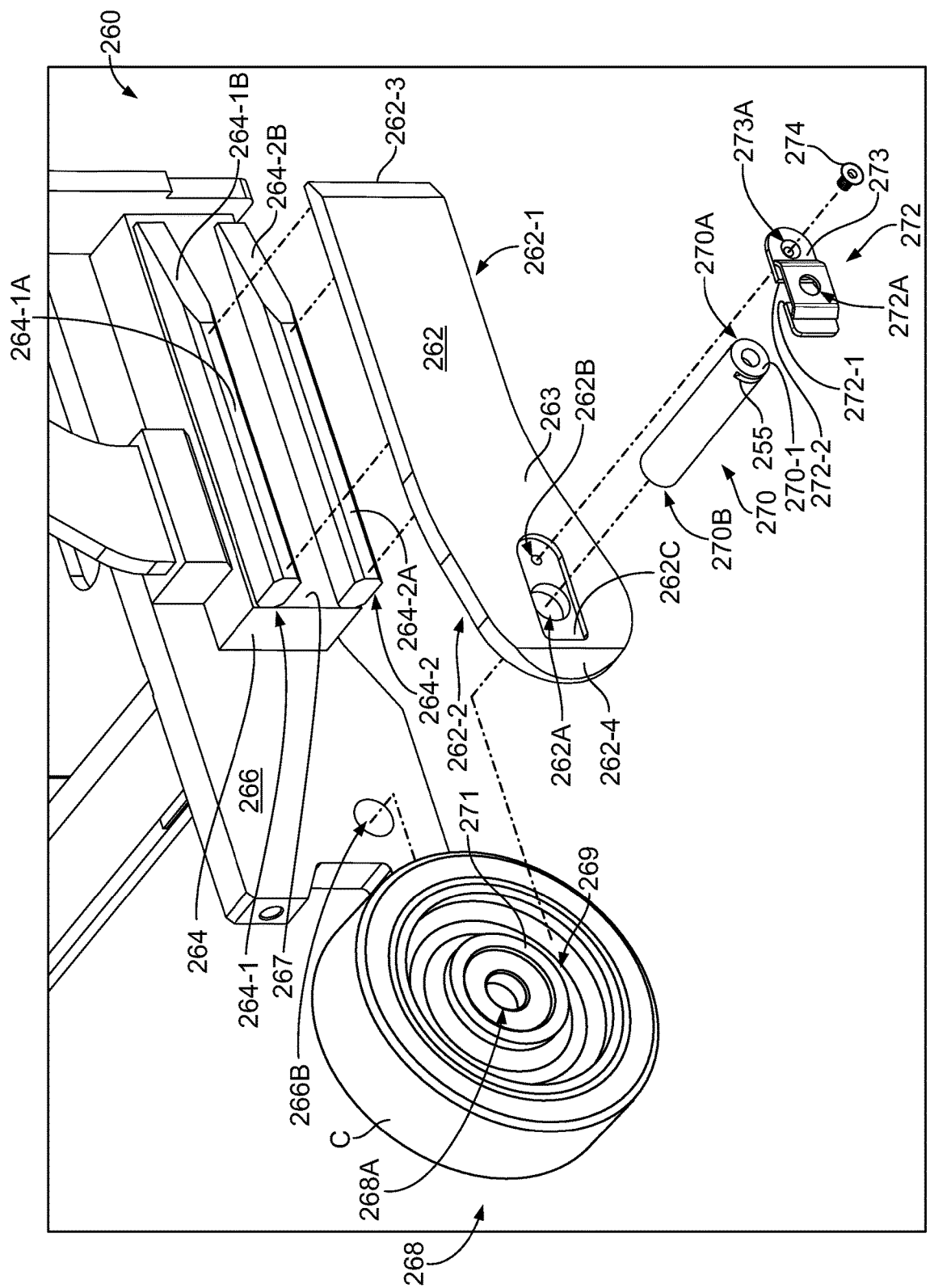
FIG. 11 is an exploded view of a left load wheel assembly of an industrial vehicle, in accordance with principles of the present disclosure.
Figure 12:
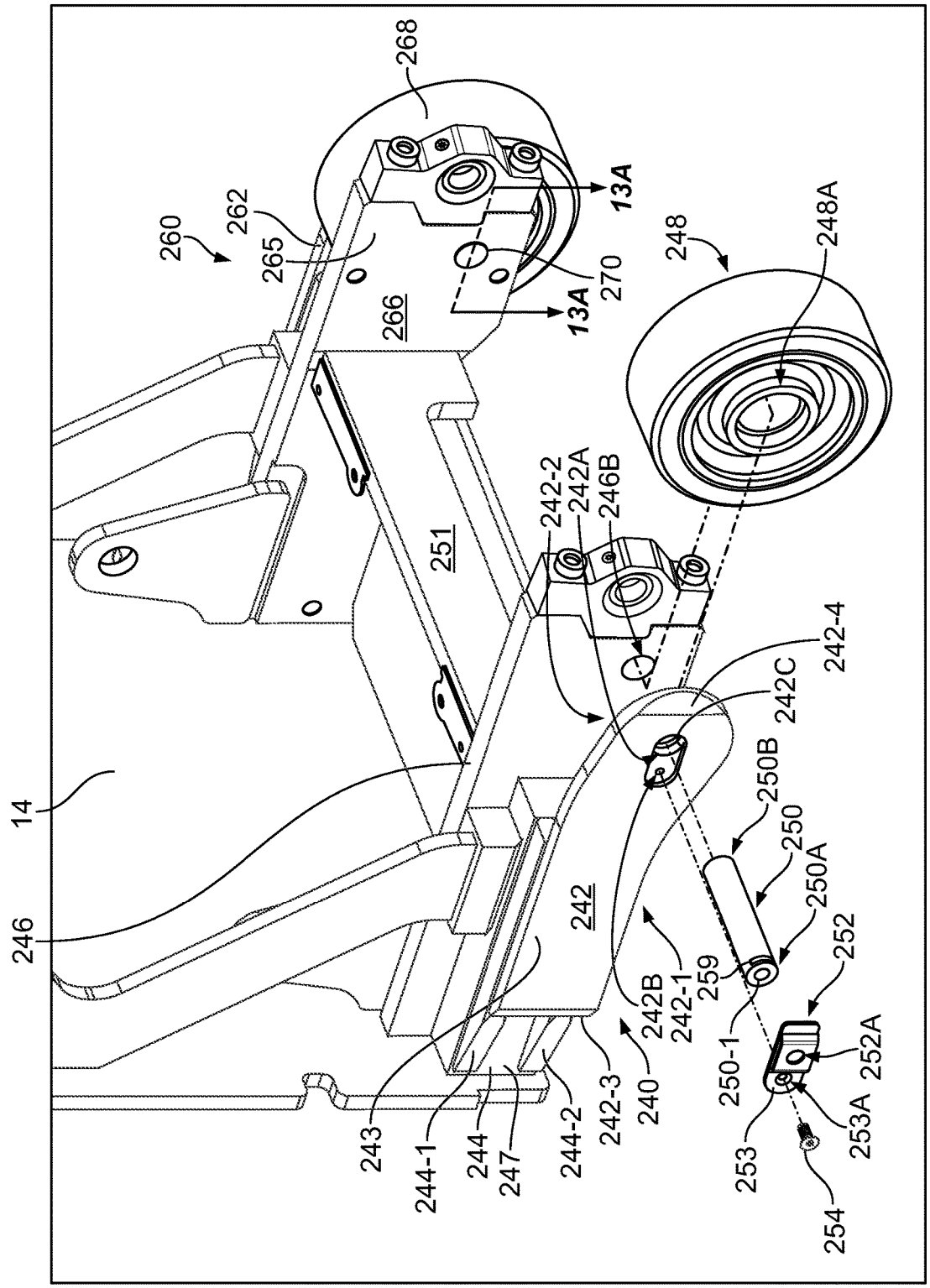
FIG. 12 is a perspective view of the left load wheel assembly of FIG. 11 in a fully assembled state and a partially exploded, perspective view of a right load wheel assembly.

FIGS. 11 and 12 illustrate example load wheel assemblies 240, 260 in accordance with another aspect of the present disclosure, in which the mast assembly 20 and fork carriage assembly 30 have been removed to illustrate additional aspects of the load wheel assemblies 240, 260 in detail. Each load wheel assembly 240, 260 may comprise a respective side plate 242, 262, support arm 244, 264, and frame member 246, 266. The frame members 246, 266 extend forward from and are fixedly coupled to the frame 14. The support arms 244, 264 may be fixedly coupled to a respective one of the frame members 246, 266, and the side plates 242, 262 are coupled to a forward end of a respective one of the support arms 244, 264, as described in more detail below. A horizontal support 251 may extend between and be fixedly coupled to the frame members 246, 266.

The load wheel assemblies 240, 260 may each comprise an axle 250, 270, which may be substantially cylindrical and may comprise a respective first end 250A, 270A and second end 250B. 270B. The axles 250, 270 extend between respective ones of the side plates 242, 262 and the frame members 246, 266. In particular, the side plates 242, 262 may each comprise an opening 242A, 262A, and the frame members 246, 266 may each comprise an opening 246B, 266B. The openings 242A, 262A, 246B, 266B extend through a thickness of the respective side plates 242, 262 and frame members 246, 266 and receive the axles 250, 270, as described below. A load wheel 248, 268 may be rotatably mounted to and supported on a respective one of the axles 250, 270. With reference to the load wheel 268 in FIGS. 11 and 13A, the load wheel 268 may comprise a casted wheel 269 with a bearing 271 mounted within the casted wheel 269, in which the bearing 271 comprises a central opening 268A that receives the axle 270. A wheel cover C is formed over the casted wheel 269 and may comprise, for example, polyurethane. One or more washers 275 may be provided on the axle 270 between the load wheel 268 and adjacent portions of the side plate 262 and frame member 266. Although not shown in detail, the load wheel 248 may comprise a substantially similar structure, including a central opening 248A.

To install the axles 250, 270 in FIGS. 11 and 12, the second end 250B, 270B of each axle 250, 270 may be inserted from the outside of the load wheel assemblies 240, 260 into the openings 242A, 262A in a respective side plate 242, 262 and through the central opening 248A, 268A in the respective load wheel 248, 268. The second end 250B, 270B of the axles 250, 270 may then be inserted into the openings 246B, 266B in the respective frame members 246, 266, such that the first ends 250A, 270A of the axles 250, 270 are received in the respective openings 242A, 262A in the side plate 262. In some instances, during manufacture (typically prior to installation of the mast assembly 20 (see FIG. 1)), the axles 250, 270 may be installed by inserting the first ends 250A, 270A into the openings 246B, 266B in the respective frame members 246, 266 from the inside of the load wheel assemblies 240, 260; through the central openings 248A, 268A in the load wheels 248, 268; and into the openings 242A, 262A in the respective side plates 242, 262. A first end surface 250-1, 270-1 of each axle 250, 270 may be substantially flush with, or slightly recessed with respect to, an outer surface 243, 263 of the respective side plates 242, 262, as described below in more detail. A second end surface (only the second end surface 270-2 is visible) of the axles 250, 270 may be substantially flush with an outer surface (only the outer surface 265 is visible) of the respective frame members 246, 266.

The support arms 244, 264 may each comprise a respective plurality of rails 244-1, 244-2 and 264-1, 264-2 extending outwardly from an outer surface 247, 267 of the support arm 244, 264. The side plate 242 may be fixedly coupled to the rails 244-1, 244-2, and the side plate 262 may be fixedly coupled to the rails 264-1, 264-2. With reference to the detailed view of the right load wheel assembly 160 in FIG. 11, the rails 264-1, 264-2 may extend along substantially an entirety of the support arm 264 and may be fixedly coupled to the outer surface 267 of the support arm 264. Each rail 264-1, 264-2 may comprise a forward section 264-1A, 264-2A with a substantially planar outer surface (not separately labeled) and a rear section 264-1B, 264-2B that tapers inward toward the support arm 264. The side plate 262 may comprise a first section 262-1 and a second section 262-2 that is forward of the first section 262-1. The first section 262-1 of the side plate 262 may be substantially planar and may be fixedly coupled to the forward sections 264-1A, 264-2A of the rails 264-1, 264-2, i.e., to the substantially planar outer surfaces of the forward sections 264-1A, 264-2A. The dimensions of the support arm 264 may substantially correspond to the dimensions of the first section 262-1 of the side plate 262, and the rails 264-1, 264-2 may comprise an upper rail, e.g., rail 264-1, and a lower rail, e.g., rail 264-2, that may be spaced apart on the support arm 264 such that an upper surface (not separately labeled) of the upper rail 264-1 may be substantially flush with an upper surface (not separately labeled) of the first section 262-1 of the side plate 262 and a lower surface (not shown) of the lower rail 264-2 may be substantially flush with a lower surface (not shown) of the first section 262-1 of the side plate 262.

Figure 13A:
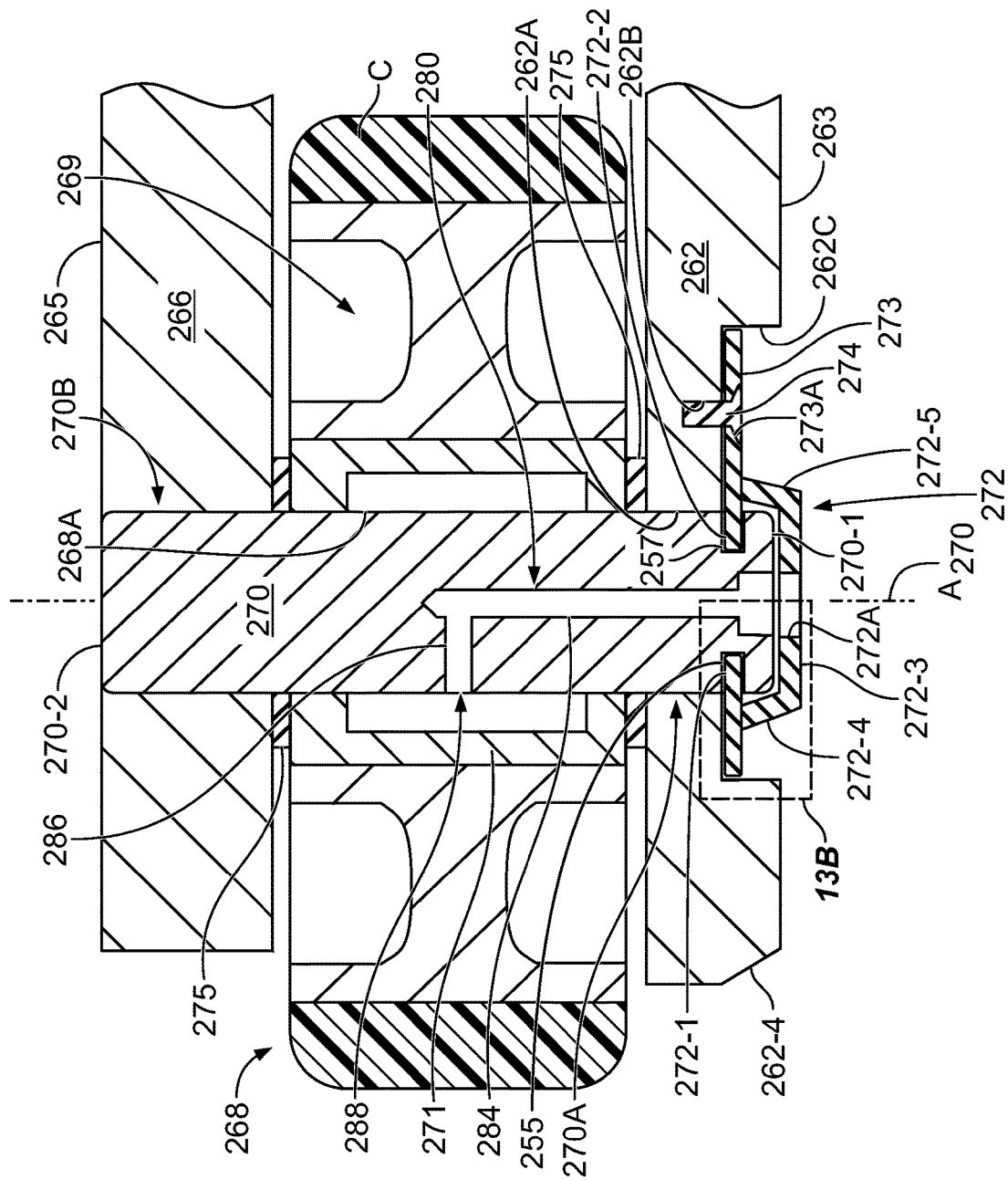
FIG. 13A is a cross-sectional view taken along line 13A-13A in FIG. 12.

A height of the rails 264-1, 264-2 with respect to the outer surface 267 of the support arm 264 (i.e., a dimension in a direction parallel to an axis $A_{270}$ of the axle 270; see FIG. 13A) may be adjusted to accommodate a thickness of the load wheel 268. Alternatively or in addition, the second section 262-2 of the side plate 262, which comprises the opening 262A that receives the second end 270B of the axle 270, may curve slightly outwardly with respect to the first section 262-1 along at least a portion of the second section 262-2. A degree of curvature of the second section 262-2 may be configured such that the second section 262-2 is spaced axially apart from the frame member 266 (i.e., in a direction parallel to the axis $A_{270}$ of the axle 270; see FIG. 13A) a sufficient distance to accommodate the load wheel 268.

With continued reference to FIG. 11, a rear end of the first section 262-1 of the side plate 262 may comprise a chamfered trailing or rear edge 262-3, and a forward end of the second section 262-2 may comprise a chamfered leading or front edge 262-4, with both chamfered edges 262-3, 262-4 being angled inward toward the support arm 264 and the frame member 266. An angle of the chamfered rear edge 262-3 may substantially correspond to the tapering of the rear sections 264-1B, 264-2B of the rails 264-1, 264-2. The chamfered rear and front edges 262-3, 262-4 may help to prevent the side plate 262 from catching on an object during a side-swipe or other type of impact, as described in detail with respect to the load wheel assemblies 40, 60 in FIGS. 2, 3A, and 3B.

As shown in FIG. 12, the side plate 242 and support arm 244 may comprise a substantially similar structure, with the rails 244-1, 244-2 extending along substantially an entirety of the support arm 244 and being fixedly coupled to the outer surface 247 of the support arm 244. The rails 244-1, 244-2 may comprise forward and rear sections (not labeled), in which the rear sections taper inward toward the support arm 244. The side plate 242 may comprise a first section 242-1 that may be substantially planar and a second section 242-2 that is forward of the first section 242-1. A height of the rails 244-1, 244-2 with respect to the outer surface 247 of the support arm 244 may be adjusted to accommodate a thickness of the load wheel 248, as described above with respect to the right load wheel assembly 260. Alternatively or in addition, the second section 242-2 of the side plate 242 may curve slightly outwardly with respect to the first section 242-1 along at least a portion of the second section 242-2, with a degree of curvature of the second section 242-2 being configured such that the second section 242-2 is spaced axially apart from the frame member 246 a sufficient distance to accommodate the load wheel 248. A rear end of the first section 242-1 of the side plate 242 may comprise a chamfered trailing or rear edge 242-3, and a forward end of the second section 242-2 may comprise a chamfered leading or front edge 242-4, with both chamfered edges 242-3, 242-4 being angled inward toward the support arm 244 and frame member 246.

The axles 250, 270 may be fixed to the respective side plates 242, 262 by a keeper in the form of a keeper bracket 252, 272 that may be coupled to the first end 250A, 270A of the axle 250, 270. With reference to FIGS. 11 and 13A, the first end 270A of the axle 270 may comprise grooves 255, 257 that extend inward from an outer surface (not labeled) of the axle 270, as described in more detail below. The grooves 255, 257 may be spaced inward from the first end surface 270-1 of the axle 270 in a direction parallel to the longitudinal axis $A_{270}$, such that a portion of the first end 270A of the axle 270 may form a "T" shape in cross-section, as shown in FIG. 13A. The keeper bracket 272 may define a T-slot that fits over the first end 270A of the axle 270. The keeper bracket 272 may comprise first and second extensions 272-1, 272-2, a substantially planar section 272-3, and first and second sidewalls 272-4, 272-5 joining respective ones of the first and second extensions 272-1, 272-2 to the substantially planar section 272-3. In some examples, the sidewalls 272-4, 272-5 may angle slightly away from each other, as shown in FIG. 13A, and in other examples (not shown), the sidewalls 272-4, 272-5 may be substantially perpendicular to the substantially planar section 272-3. The keeper bracket 272 may be formed as a single piece or the extensions 272-1, 272-2 may be fixedly coupled to the sidewalls 272-4, 272-5.

As shown in FIG. 12, the axle 250 may comprise a structure that may be substantially similar to the structure of the axle 270. The axle 250 may comprise grooves (only one groove 259 is visible) that extend inward from an outer surface (not labeled) of the axle 250 and may be spaced inward from the first end surface 250-1 of the axle 250, such that a portion of the first end 250A of the axle 250 may form a "T" shape in cross-section (not shown). The keeper bracket 252 may comprise a structure that is substantially similar to the keeper bracket 272 and may define a T-slot that fits over the first end 250A of the axle 250.

At least a portion of the keeper brackets 252, 272 extend across the outer surfaces 243, 263 of the respective side plates 242, 262 in a lateral direction, i.e., in a direction that is substantially perpendicular to the longitudinal axes of the axles 250, 270 (only the longitudinal axis $A_{270}$ of the axle 270 is shown). The keeper brackets 252, 272 may be received in a recessed area 242C, 262C formed in the outer surface 243, 263 of the respective side plates 242, 262. A shape and one or more dimensions (e.g., a length, width, and depth) of the recessed areas 242C, 262C may be configured such that the keeper brackets 252, 272 fit snugly within and engage the recessed areas 242C, 262C, as described in more detail below. The openings 242A, 262A in the side plates 242, 262 that receive the axles 250, 270 may also be formed in the respective recessed areas 242C, 262C.

Each keeper bracket 252, 272 may comprise a tab 253, 273 with an aperture 253A, 273A that extends through a thickness of the tab 253, 273 and receives a fastener 254, 274. As shown in detail in FIG. 13A with respect to the keeper bracket 272, the tab 273 may be integral with the second extension 272-2. The fasteners 254, 274 extend through the respective apertures 253A, 273A and are received in a threaded bore 242B, 262B formed in the recessed areas 242C, 262C of the respective side plates 242, 262. The apertures 253A, 273A and fasteners 254, 274 may be spaced apart in the lateral direction from the longitudinal axes of the respective axles 250, 270 (as noted above, only the longitudinal axis $A_{270}$ of the axle 270 is shown).

As shown in the detailed view of FIG. 13A, when the axle 270 and keeper bracket 272 are installed, the first end surface 270-1 of the axle 270 may be recessed with respect to the outer surface 263 of the side plate 262. In some examples, a portion of the keeper bracket 272, e.g., the substantially planar section 272-3, may extend slightly outwardly from the outer surface 263 of the side plate 262, as shown in FIGS. 12 and 13A. In other examples (not shown), the keeper bracket 272 may be substantially flush with the outer surface 263 of the side plate 262. The second end surface 270-2 of the axle 270 may be substantially flush with the outer surface 265 of the frame member 266. In some examples, the apertures 253A, 273A may comprise a countersink, and the fasteners 254, 274 may each comprise a threaded screw, bolt, or other type of fastener with a countersunk head, as shown in FIGS. 11, 12, and 13A and as described herein, such that the fasteners 254, 274 may be substantially flush with an outer surface (not labeled) of the respective tab 253, 273 following installation. In other examples (not shown), the fasteners 254, 274 may comprise a non-countersunk head with a substantially planar bearing surface, and the apertures 253A, 273A may comprise a substantially uniform diameter. The dimensions of the recessed areas 242C, 262C may be such that fasteners with a non-countersunk head may still be substantially flush with, or recessed with respect to, the outer surfaces 243, 263 of the side plates 242, 262. Although not shown in detail, it is understood that the axle 250 and keeper bracket 252 may comprise a substantially similar structure.

As described above with respect to the load wheel assemblies 40, 60 in FIGS. 2, 3A, and 3B, minimizing the extent to which any components of the load wheel assemblies 240, 260 are raised above the outer surfaces 243, 263 of the side plates 242, 262 reduces the risk of damage to these components from side-swipe and other types of impacts and may also help to reduce the risk of damage to the object that is struck, as the smoothness of the outer surfaces 243, 263 of the side plates 242, 262 may allow the side plates 242, 262 to slide along the object rather than catching on it. As shown in FIG. 13A, in examples in which a portion of the keeper bracket 272 extends slightly outwardly from the outer surface 263 of the side plate 262, the sidewalls 272-4, 272-5 may be angled to help prevent the keeper bracket 272 from catching on objects. In examples in which the sidewalls 272-4, 272-5 are perpendicular to the substantially planar section 272-3 (not shown), the dimensions of the recessed areas 242C, 262C may be such that the substantially planar section 272-3 of the respective fastener 254, 274 is substantially flush with the outer surface 243, 263 of the side plate 242, 262. Because the second ends 250B, 270B of the axles 250, 270 may be substantially flush with the outer surfaces 265 of the frame members 246, 266, these outer surfaces 265 may also be substantially smooth.

Figure 13B:
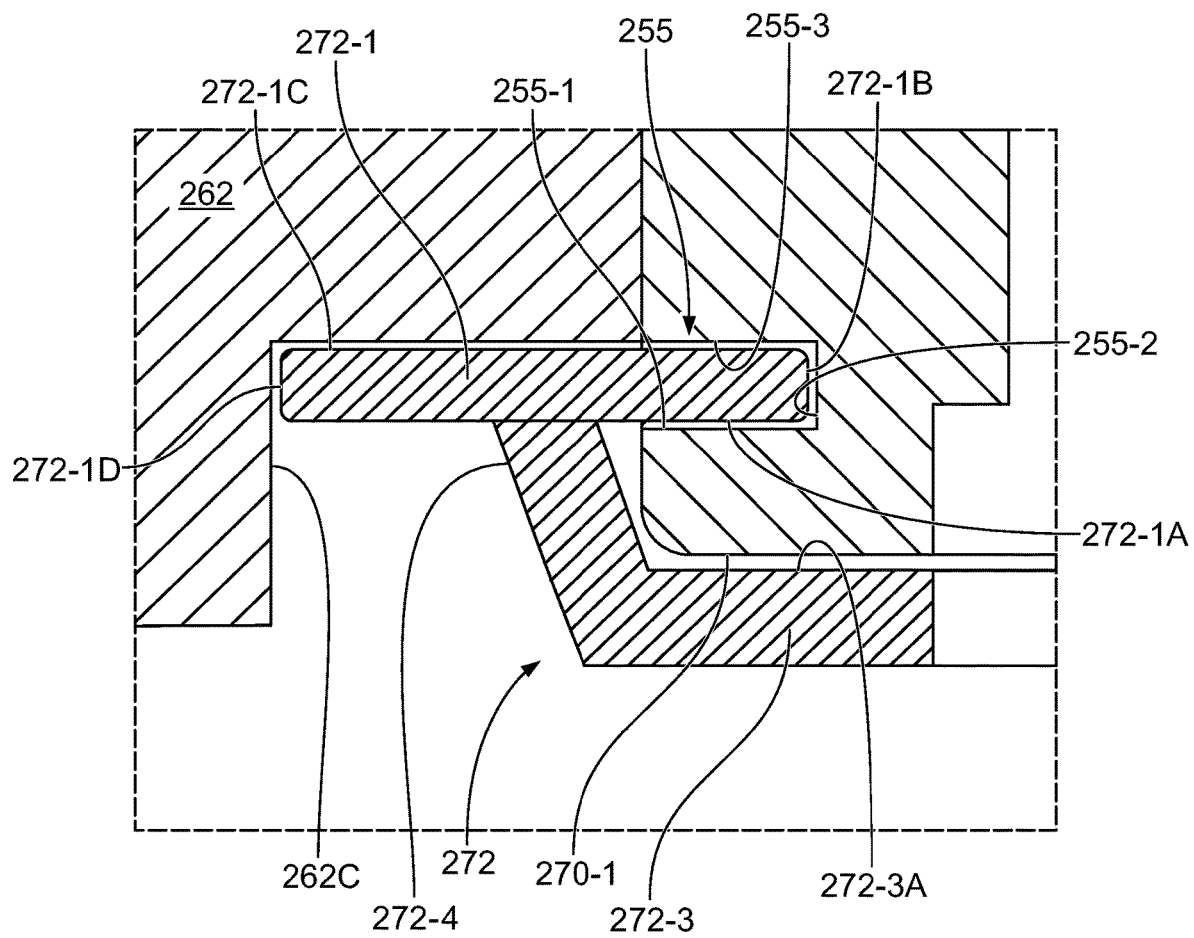
FIG. 13B is a detailed view of a portion of FIG. 13A.

The keeper brackets 252, 272 may be coupled to and engage the first ends 250A, 270A of the axles 250, 270 to prevent the axles 250, 270 from rotating and to prevent the axles 250, 270 from moving axially, e.g., in a direction parallel to their longitudinal axes (again, only longitudinal axis $A_{270}$ of the axle 270 is shown). With reference to the keeper bracket 272 in FIGS. 13A and 13B, a shape and one or more dimensions of the keeper bracket 272 may be configured such that the T-slot defined by the keeper bracket 272 fits closely to the first end 270A of the axle 270. For example, the dimensions of the substantially planar section 272-3 may substantially correspond to a diameter of the axle 270, and the dimensions and/or angles of the sidewalls 272-4, 272-5 may be configured to ensure a close fit between an inner surface 272-3A of the substantially planar section 272-3 and the first end surface 270-1 of the axle 270. The first and second extensions 272-1, 272-2 of the keeper bracket 272 extend into and engage the grooves 255, 257. With reference to the detailed view in FIG. 13B, the groove 255 formed in the axle 270 may define, in cross-section, a "U" shape with a first section 255-1 extending inward from the outer surface of the axle 270 in a direction that is substantially perpendicular to the axis $A_{270}$ of the axle 270; a second section 255-2 extending from the first section 255-1 toward the second end 270B of the axle 270 in a direction that is substantially parallel to the axis $A_{270}$; and a third section 255-3 extending from the second section 255-2 to the outer surface of the axle 270 in a direction that is substantially perpendicular to the axis $A_{270}$.

When the keeper bracket 272 is slidably inserted over the first end 270A of the axle 270, a first surface 272-1A of the first extension 272-1 contacts and engages the first section 255-1 of the groove 255; a first edge 272-1B of the first extension 272-1 contacts and engages the second section 255-2 of the groove 255, and a second surface 272-1C of the first extension 272-1 contacts and engages the third section 255-3 of the groove 255. The second surface 272-1C and a second edge 272-1D of the first extension 272-1 also contact and engage adjacent sections of the recessed area 262C formed in the side plate 262. Axial movement of the axle 270, e.g., movement in a direction that is substantially parallel to the axis $A_{270}$, in both directions (i.e., outward from the side plate 262 and inward from the frame member 266) is prevented by the engagement of the first and second surfaces 272-1A, 272-1C of the first extension 272-1 with the first and third sections 255-1, 255-3 of the groove 255 and with the recessed area 262C in the side plate 262. Rotational movement of the axle 270 with respect to the side plate 262 and the frame member 266 is prevented by the engagement of the first and second edges 272-1B, 272-1D of the first extension 272-1 with the second section 255-2 of the groove 255 and with the recessed area 262C. The groove 257 comprises a similar "U" shape, and the second extension 272-2 similarly engages the groove 257 and the recessed area 262C to prevent rotational and axial movement of the axle 270. Although not illustrated in detail, the keeper bracket 252 shown in FIG. 12 may similarly comprise extensions (not labeled) that engage the grooves (only one groove 259 is visible) formed in the first end 250A of the axle 250.

Axial movement of the keeper brackets 252, 272 is prevented by coupling of the keeper brackets 252, 272 to the side plates 242, 262 via the fasteners 254, 274, and rotational movement of the keeper brackets is prevented by engagement between the keeper brackets 252, 272 and the recessed areas 242C, 262C in the side plates 242, 262. For example, an outer shape of each keeper bracket 252, 272 (including the tabs 253, 273) may comprise a rounded edge and three substantially straight edges (not separately labeled), and the recessed areas 242C, 262C may comprise a shape and one or more dimensions (e.g., a length, width, and depth) that substantially correspond to the outer shape and one or more dimensions of the keeper brackets 252, 272, such that the keeper brackets 252, 272 fit snugly in and engage the recessed areas 242C, 262C to prevent rotational movement of the keeper brackets 252, 272 with respect to the side plates 242, 262.

As described above, the keeper brackets 252, 272 secure the axles 250, 270 to the side plates 242, 262 and act as anti-rotation features that prevent rotational movement and axial movement of the axles 250, 270. The keeper brackets 252, 272 further allow the load wheels 248, 268 to be serviced and/or replaced without the need to remove the side plates 242, 262 or other components of the load wheel assemblies 240, 260, the mast assembly 20, or the fork carriage assembly 30 (see FIG. 1). As described above with respect to the axles 50, 70, installation of the mast assembly 20 (see FIG. 1) may at least partially block access to the second ends 250B, 270B of the axles 150, 170. To access the load wheels 248, 268, the keeper brackets 252, 272 may be uninstalled by removing the fasteners 254, 274, and the axles 250, 270 may be removed from the outside of the load wheel assemblies 240, 260 through the openings 242A, 262A in the side plates 242, 262 in a known manner using an axle removal tool.

As shown in FIG. 13A, the axle 270 may comprise an internal path 280 for introducing a lubricant that may be substantially similar to the internal path 80 described with respect to the axle 50 in FIG. 3B. The internal path 280 may comprise an enlarged section (not labeled), a central passage 284, and a channel 286 that extends from the central passage 284 to an opening 288 formed in an outer surface of the axle 270. A grease fitting (not shown) may be received in a threaded section (not shown) of the central passage adjacent to the first end surface 270-1 of the axle 270. The substantially planar section 272-3 of the keeper bracket 272 may comprise an aperture 272A that is aligned with the central passage 284 to allow access to the grease fitting without the need to remove the keeper bracket 272. As shown in FIG. 12, the keeper bracket 252 comprises a similar aperture 252A, and although not shown, it is understood that the axle 250 may comprise a substantially similar internal path for lubricant and a grease fitting.

Similar to the axles 50, 70, lubricant (not shown) may be introduced into the load wheel assemblies 240, 260 by removing only the grease fittings and introducing lubricant into the internal paths 280. The lubricant exits the opening 288 and flows between the axles 250, 270 and the load wheels 248, 268. The grease fittings are accessible from the outside of the load wheel assemblies 240, 260 with no need to remove the side plates 242, 262, the keeper brackets 252, 272, or other component(s) of the load wheel assemblies 240, 260. Also similar to the axles 50, 70, the openings 288 in the axle 250, 270 may be positioned at a predetermined location with respect to the load wheels 248, 268 by the fixation of the axles 250, 270 from rotational and axial movement, e.g., via the coupling of keeper brackets 252, 272 to the first ends 250A, 270A of the axles 250, 270 and to the side plates 242, 262.

Having thus described the invention of the present application in detail and by reference to embodiments thereof, it will be apparent that modifications and variations are possible without departing from the scope of the invention defined in the appended claims.

What is claimed is:

1. A load wheel assembly comprising:
a frame member;
a side plate coupled to the frame member;

a support arm positioned between and coupled to the frame member and the side plate, wherein the frame member extends along an entirety of a length of the support arm;

an axle extending between the frame member and the side plate; and a keeper coupled by a fastener to the frame member or the side plate, wherein the keeper is coupled to one end of the axle to prevent rotational and axial movement of the axle relative to the frame member and the side plate.

2. The load wheel assembly of claim 1, wherein a portion of the keeper extends across an outer surface of the side plate or the frame member in a lateral direction that is substantially perpendicular to a longitudinal axis of the axle.

3. The load wheel assembly of claim 1, wherein the fastener is spaced apart in a lateral direction from a longitudinal axis of the axle, the lateral direction being substantially perpendicular to the longitudinal axis of the axle.

4. The load wheel assembly of claim 1, wherein the keeper is coupled to the frame member and wherein:
the keeper comprises an aperture that receives the fastener; and
an outer surface of the frame member comprises a recessed area that receives the keeper, the recessed area comprising a threaded bore that receives the fastener.

5. The load wheel assembly of claim 1, wherein the keeper is coupled to the side plate and wherein:
the keeper comprises an aperture that receives the fastener; and
an outer surface of the side plate comprises a recessed area that receives the keeper, the recessed area comprising a threaded bore that receives the fastener.

6. The load wheel assembly of claim 1, wherein the keeper is coupled to the side plate and wherein:
the one end of the axle comprises a flattened section; and
the keeper comprises a keeper plate with a flattened edge that engages the flattened section of the one end of the axle.

7. The load wheel assembly of claim 6, wherein:
the flattened section of the one end of the axle comprises a cutout; and
the flattened edge of the keeper plate engages the cutout.

8. The load wheel assembly of claim 6, wherein the other end of the axle is received in an opening extending through a thickness of the frame member, an outer section of the opening comprising a circumferential extension that defines an abutment surface for the axle to prevent axial movement of the axle past the circumferential extension.

9. The load wheel assembly of claim 1, wherein the keeper is coupled to the side plate and wherein:
the one end of the axle comprises a plurality of grooves, the grooves being spaced away from an end surface of the axle and extending inward from an outer surface of the axle; and
a portion of the keeper fits over the one end of the axle and comprises a plurality of extensions that engage the grooves formed in the one end of the axle.

10. The load wheel assembly of claim 1, wherein the keeper comprises a tab fixedly coupled to an end surface of the one end of the axle, the tab extending outward from the end surface in a direction perpendicular to a longitudinal axis of the axle.

11. The load wheel assembly of claim 1, wherein the axle comprises:
a central passage formed through a portion of the axle, the central passage extending from an end surface along a longitudinal axis of the axle; and
a channel extending from the central passage to an opening in an outer surface of the axle.

12. The load wheel assembly of claim 11, wherein:
the central passage and the channel are provided for introducing a lubricant between the axle and a load wheel supported by the axle; and
the opening in the outer surface of the axle is positioned at a predetermined location with respect to the load wheel by the coupling of the keeper to the one end of the axle and to the frame member or the side plate.

13. The load wheel assembly of claim 1, wherein the side plate is removably coupled to the support arm via one or more fasteners.

14. The load wheel assembly of claim 1, wherein:
the support arm comprises one or more pins extending outwardly from an outer surface thereof; and
the side plate comprises one or more corresponding apertures that receive the pins.

15. The load wheel assembly of claim 1, wherein:
the support arm comprises a plurality of rails extending outwardly from an outer surface thereof; and
the side plate is fixedly coupled to the rails.

16. A load wheel assembly comprising:
a frame member;
a side plate coupled to the frame member;
a support arm positioned between and coupled to the frame member and the side plate, wherein the frame member extends along an entirety of a length of the support arm;
an axle comprising a first end that is received in a first opening formed in the side plate and a second end that is received in a second opening formed in the frame member, wherein the first end of the axle comprises a flattened section; and
a keeper plate coupled by a fastener to an outer surface of the side plate, wherein the outer surface of the side plate comprises a recessed area that receives the keeper plate, the keeper plate comprising a flattened edge that engages the flattened section of the first end of the axle to prevent rotational movement of the axle relative to the frame member and the side plate.

17. The load wheel assembly of claim 16, wherein:
the flattened section of the first end of the axle comprises a cutout; and
the flattened edge of the keeper plate engages the cutout.

18. The load wheel assembly of claim 16, wherein an outer section of the opening formed in the frame member comprises a circumferential extension that defines an abutment surface for the second end of the axle to prevent axial movement of the axle past the circumferential extension.

19. The load wheel assembly of claim 16, wherein:
the support arm comprises a plurality of rails extending outwardly from an outer surface thereof; and
the side plate is fixedly coupled to the rails.

* * * * *

UNITED STATES PATENT AND TRADEMARK OFFICE
CERTIFICATE OF CORRECTION

PATENT NO. : 11,104,558 B2
APPLICATION NO. : 16/233607
DATED : August 31, 2021
INVENTOR(S) : Clinton L. Reges et al.

Page 1 of 1

It is certified that error appears in the above-identified patent and that said Letters Patent is hereby corrected as shown below:

In the Specification

Column 15, Line 53, "received in the apertures 142" should read --received in the apertures 142C--

Signed and Sealed this
Thirteenth Day of September, 2022

Katherine Kelly Vidal
*Director of the United States Patent and Trademark Office*